US009527715B2

(12) United States Patent
Boggs et al.

(10) Patent No.: US 9,527,715 B2
(45) Date of Patent: Dec. 27, 2016

(54) CARTRIDGE FOR A DISPENSING SYSTEM

(71) Applicant: PepsiCo, Inc., Purchase, NY (US)

(72) Inventors: Joseph H. Boggs, Newton, CT (US); Paul J. Donnelly, New Fairfield, CT (US); Arthur Forkos, Short Hills, NJ (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 14/822,352

(22) Filed: Aug. 10, 2015

(65) Prior Publication Data

US 2015/0344283 A1 Dec. 3, 2015

Related U.S. Application Data

(63) Continuation of application No. 13/758,601, filed on Feb. 4, 2013, now Pat. No. 9,126,738.

(51) Int. Cl.

| | |
|---|---|
| ***G06F 17/00*** | (2006.01) |
| ***B67D 1/08*** | (2006.01) |
| ***B65D 21/02*** | (2006.01) |
| ***B65D 77/06*** | (2006.01) |
| ***B65D 81/02*** | (2006.01) |

(52) U.S. Cl.

CPC ......... *B67D 1/0878* (2013.01); *B65D 21/0233* (2013.01); *B65D 21/0234* (2013.01); *B65D 77/06* (2013.01); *B65D 81/02* (2013.01); *B67D 1/0801* (2013.01); *B67D 1/0888* (2013.01); *B67D 2001/0811* (2013.01); *B67D 2001/0812* (2013.01); *Y10T 29/49826* (2015.01)

(58) Field of Classification Search

CPC ............ G03G 15/0863; G03G 15/0855; G03G 15/0865; G03G 15/55; G03G 15/553; G03G 21/1882; G03G 21/1889; G03G 15/0848; G03G 15/0856; G03G 15/105; G03G 15/50; G03G 15/556; G03G 21/1652; G03G 21/20; B67D 1/0888; B67D 1/0801; B67D 1/0878; B67D 2001/0812; B67D 2001/0811; B65D 21/0233; B65D 77/06; B65D 21/0234

USPC ........................ 235/375, 380, 492, 486, 487

See application file for complete search history.

(56) References Cited

U.S. PATENT DOCUMENTS

| | | | |
|---|---|---|---|
| D183,532 | S | 9/1958 | McCauley |
| D185,006 | S | 4/1959 | Langevin |
| D188,909 | S | 9/1960 | Maxson et al. |
| 3,363,807 | A | 1/1968 | Powell |
| D215,533 | S | 10/1969 | Gilson |
| 4,014,450 | A | 3/1977 | Girotti et al. |

(Continued)

FOREIGN PATENT DOCUMENTS

| | | | |
|---|---|---|---|
| DE | 3434174 A1 | | 3/1986 |
| JP | 405193775 | * | 8/1993 |

*Primary Examiner* — Thien M Le

(74) *Attorney, Agent, or Firm* — Sterne, Kessler, Goldstein & Fox P.L.L.C.

(57) ABSTRACT

A cartridge is provided that comprises a housing. The housing is configured to maintain a pouch within the housing. The cartridge comprises a top and a bottom. The cartridge comprises at least one top mating member at the top of the cartridge and at least one bottom mating member at the bottom of the cartridge. The at least one top mating member is asymmetric with the at least one bottom mating member. Each mating member is configured to match with a corresponding mating member of a cartridge frame or rack.

21 Claims, 33 Drawing Sheets

(56) References Cited

U.S. PATENT DOCUMENTS

| | | | |
|---|---|---|---|
| D251,564 S | 4/1979 | MacKrell | |
| D265,653 S | 8/1982 | Arzberger et al. | |
| D272,976 S | 3/1984 | LaLumiere | |
| 4,493,441 A | 1/1985 | Sedam et al. | |
| 4,566,287 A | 1/1986 | Schmidt et al. | |
| 4,883,935 A | 11/1989 | Fairchild et al. | |
| 4,911,331 A | 3/1990 | Sedam | |
| 5,136,317 A * | 8/1992 | Goto | G03B 17/24 396/210 |
| D340,642 S | 10/1993 | Detzel et al. | |
| 5,332,114 A | 7/1994 | Sano et al. | |
| D404,950 S | 2/1999 | Burch | |
| 5,878,907 A | 3/1999 | Graf | |
| D428,341 S | 7/2000 | Boutin | |
| 6,264,056 B1 | 7/2001 | King | |
| D451,799 S | 12/2001 | Berger et al. | |
| 6,488,179 B1 | 12/2002 | Vujicic et al. | |
| D471,047 S | 3/2003 | Gordon et al. | |
| 6,698,229 B2 | 3/2004 | Renken et al. | |
| 6,827,237 B2 | 12/2004 | Yorn et al. | |
| D522,854 S | 6/2006 | Engels et al. | |
| D563,234 S | 3/2008 | Moreno | |
| D579,348 S | 10/2008 | Piccinino, Jr. et al. | |
| D594,761 S | 6/2009 | Lusker | |
| 7,571,835 B2 | 8/2009 | Hill et al. | |
| D611,287 S | 3/2010 | Lochen | |
| D611,298 S | 3/2010 | Freeman et al. | |
| 7,726,136 B2 | 6/2010 | Baxter et al. | |
| 7,726,483 B2 | 6/2010 | Ramanujam et al. | |
| D618,963 S | 7/2010 | Freeman et al. | |
| D643,682 S | 8/2011 | Asthon | |
| D646,105 S | 10/2011 | Deo et al. | |
| 8,083,084 B2 | 12/2011 | Vovan | |
| D690,990 S | 10/2013 | Boggs et al. | |
| D690,991 S | 10/2013 | Boggs et al. | |
| 8,701,933 B2 | 4/2014 | Thomason | |
| 2003/0101735 A1 | 6/2003 | Teague et al. | |
| 2005/0103782 A1 | 5/2005 | O'Brien et al. | |
| 2005/0133583 A1* | 6/2005 | Tada | G11B 23/037 235/375 |
| 2005/0189350 A1 | 9/2005 | Hayes et al. | |
| 2006/0010458 A1* | 1/2006 | Georgis | G11B 23/0303 720/600 |
| 2006/0108415 A1 | 5/2006 | Thomas et al. | |
| 2006/0261188 A1* | 11/2006 | Ito | A01M 1/02 239/306 |
| 2007/0131711 A1 | 6/2007 | Minard et al. | |
| 2007/0173980 A1* | 7/2007 | Lovett | G05D 11/133 700/283 |
| 2008/0121662 A1 | 5/2008 | Gehl | |
| 2008/0240745 A1* | 10/2008 | Hibino | G03G 15/553 399/24 |
| 2008/0314926 A1 | 12/2008 | Kumar et al. | |
| 2009/0194560 A1 | 8/2009 | Freeman et al. | |
| 2011/0146497 A1 | 6/2011 | Sirbu Villa | |
| 2011/0192495 A1 | 8/2011 | Deo et al. | |
| 2012/0002987 A1* | 1/2012 | Odani | G03G 15/50 399/44 |

* cited by examiner

2700

2702 Placing a Top Portion of the Cartridge Upside Down so the Top Portion is Oriented to Receive a Bag 2704 Placing a Bag into the Top Portion of the Cartridge 2706 Orienting a Lower Portion of the Cartridge Upside Down so that a Bottom Face of the Lower Portion Faces Upward 2708 Placing the Lower Portion on Top of the Upper Portion 2710 Fastening the Lower Portion and the Upper Portion

CARTRIDGE FOR A DISPENSING SYSTEM

This application claims priority to U.S. application Ser. No. 13/758,601 filed on Feb. 4, 2013, which is incorporated herein in its entirety.

FIELD OF THE INVENTION

This disclosure relates generally to a cartridge for a dispensing system, e.g., for dispensing of beverages at cafeterias, restaurants, theatres, and other venues.

BACKGROUND

Various beverage dispensers, such as those at cafeterias, restaurants, theatres and other entertainment and/or food service venues, typically have either a "drop in" dispenser apparatus or a counter top type dispenser apparatus. In a drop in dispenser apparatus, the dispenser apparatus is self-contained and may be dropped into an aperture of a counter top. In a counter top type dispenser apparatus, the dispenser apparatus is placed on a counter top. In conventional beverage dispensers, a dispensing head is coupled to a particular drink syrup supply source via a single pipe dedicated to supply the particular drink syrup to that dispensing head, wherein the particular drink syrup supply source is typically located near the counter top, i.e., directly under the counter top, or directly over the counter top.

A user will typically place a cup under the signage of the selected beverage and either press a button or press the cup against a dispensing lever to activate the dispenser so that the selected beverage is delivered from the dispensing head corresponding to the selected beverage and into the cup until pressure is withdrawn from the button or lever.

Conventional beverage dispensers are limited to dispensing a limited number of drinks. For example, drinks typically available at a conventional beverage dispenser are a regular cola beverage, a diet cola beverage, perhaps one or several non-cola carbonated beverages, such as a lemon-lime flavored carbonated beverage or some other fruit-flavored drink (e.g., orange flavored carbonated beverage, and/or root beer), and perhaps one more non-carbonated beverage(s), such as a tea and/or a lemonade.

Conventional dispensers dose simultaneously components of a mixture or beverage, and the final product is obtained as a result of mixing of two or more continuous flows of the product components. This conventional approach may work well when only low concentrated components are used. If, however, one or more of the components is highly concentrated, the flow rate of such highly concentrated component(s) required for continuous mixing becomes very small. In order to create and maintain such very small and stable flows, very precise and thus more expensive dosing and dispensing equipment is required. Less expensive but less precise equipment may be able to dose highly concentrated components with required level of accuracy, but the resulting flow rate of the created flow of such components may be unacceptably high and thus inappropriate for continuous mixing of flows.

Conventional dispensers typically comprise a cardboard box and a bag, also called "bag-in-box" or "BIB." Other conventional dispensers comprise a cartridge that does not contain a bag. Cartridges of conventional dispensers are not configured in a manner that prevents a cartridge from being inserted in an incorrect location in a cartridge frame. Among other things, it would be beneficial to have cartridges that are less expensive to make and easier to use than cartridges of conventional dispensers.

What is needed is a cartridge that does not have the limitations and disadvantages of conventional cartridges.

SUMMARY

In an aspect of the disclosure, a cartridge comprises a housing. The housing is configured to maintain a pouch within the housing. The cartridge comprises a top and a bottom. The cartridge comprises at least one top mating member at the top of the cartridge and at least one bottom mating member at the bottom of the cartridge. The at least one top mating member is asymmetric with the at least one bottom mating member. Each mating member is configured to match with a corresponding mating member of a cartridge frame or rack.

The above and other aspects, features and advantages of the present disclosure will be apparent from the following detailed description of the illustrated embodiments thereof which are to be read in connection with the accompanying drawings.

DETAILED DESCRIPTION

Figure 1:
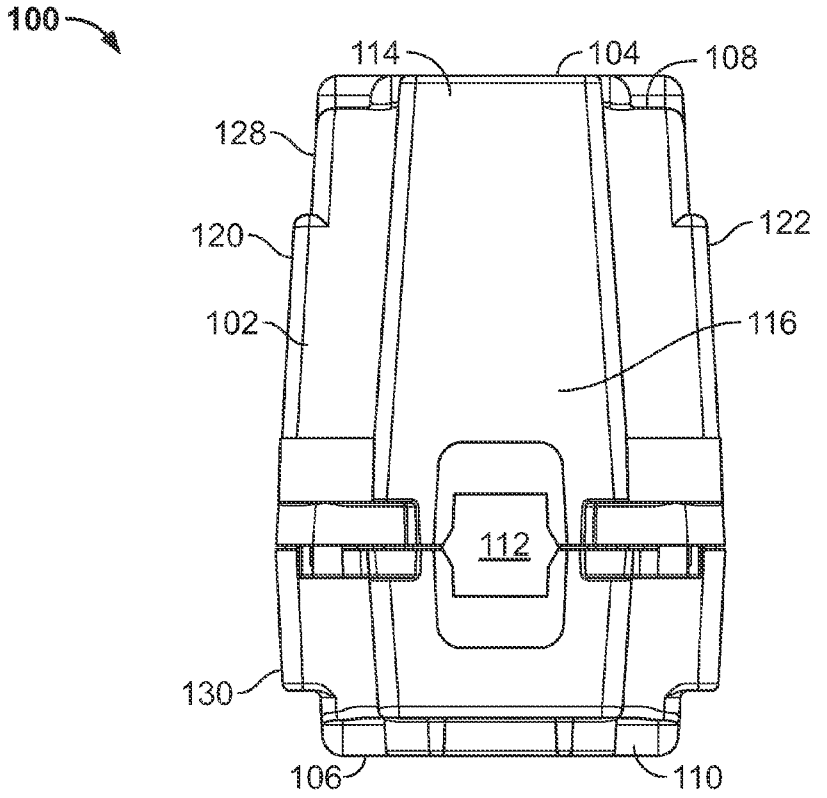
FIG. 1 is a front view of a cartridge in accordance with various aspects of the disclosure.

The embodiments discussed below may be used to order, deliver and form a wide variety of food products, including but not limited to free-flowing food products, including cold and hot beverages, and including but not limited to beverages known under any PepsiCo branded name, such as Pepsi-Cola®.

In an aspect of the disclosure, a cartridge comprises a housing. The housing is configured to maintain a pouch within the housing. The cartridge comprises a top and a bottom. The cartridge comprises at least one mating member, e.g., a channel or ridge at the top of the cartridge and at least one bottom mating member, e.g., a channel or ridge at the bottom of the cartridge. The at least one top mating member is asymmetric with the at least one bottom mating member. Each mating member, e.g., channel or ridge, is configured to match with a corresponding mating member of a cartridge frame or rack.

In an aspect of the disclosure, the cartridge comprises a pouch. The pouch may be configured to self-align in the cartridge. The pouch may be configured to be filled and then placed in a bottom portion of the cartridge. Once the pouch is placed in the bottom portion of the cartridge, the top portion of the cartridge may be added to the cartridge.

In an aspect of the disclosure, the housing may be configured to maintain any suitable pouch, such as a pouch comprising a component or ingredient for a free-flowing product, e.g., a free-flowing food product. The free-flowing food product may be beverage. The pouch that may be maintained within housing may hold an appropriate amount of net contents of a component or ingredient of a free-flowing product. For example, the cartridge may be configured to maintain a pouch having about 19.2 ounces of net contents of a component free-flowing product. The component may be a highly concentrated micro component for a beverage.

In accordance with various aspects of the disclosure, the cartridge may protect the pouch from damage, such as shipping, handling, storage, installation, and use of the cartridge in a dispensing system. The cartridge may be configured to be tamper resistant. The cartridge may be configured to identify contents maintained within the cartridge.

The cartridge may be configured to identify a current condition(s) of the cartridge or its contents, or a previous condition(s) of the cartridge or its contents. An example of a current or previous condition of the cartridge or its contents may be a temperature to which the cartridge or its contents may have been subjected. Thus, the cartridge may comprise a temperature sensor.

The cartridge may be configured to provide good chemical and/or liquid resistance. The cartridge may be configured to optimize life cycle cost and sustainability of the cartridge. In an embodiment, a cartridge comprises a thermoplastic, e.g., a high density polyethylene polymer ("HDPE") and/or polyethylene terephthalate ("PET") and/or polypropylene (PP). The cartridge may have a construction that is compatible with using a thermoplastic as the material in that construction.

In an embodiment, a cartridge may comprise a labeled panel. For example, the labeled panel may be located at an end of the cartridge. The labeled panel may have at least one label area. For example, a label area may comprise any suitable area, e.g., of 4 inches by 2.5 inches or 6 inches by $1\frac{5}{8}^{th}$ inches. A labeled panel may comprise a tamper resistant seal. The tamper resistant seal may provide an indication that the tamper resistant seal has not been tampered or breached. The tamper resistant seal may have any suitable dimensions, e.g., 1 to 2 inches in height. The labeled panel may comprise any suitable dimensions, e.g., sides that comprise about 9 square inches.

The cartridge may be configured to satisfy a drop test. For example, the cartridge may be configured to withstand a drop onto a solid surface, e.g., concrete, without breaking the cartridge from a height that may be at or exceed the height at which the cartridge may be carried at during normal shipping, handling, storage, installation, and use of the cartridge in a dispensing system shipping, e.g., a height of a few feet, e.g., four feet. In the drop test, the internal load pressure test may be 14 psi.

The cartridge may be configured to satisfy a distributed shipping load without breaking the cartridge. For example, the cartridge may be configured to withstand a 200 pound distributed shipping load when applied to a face of the cartridge, including the front face, the rear face, the top face, the bottom face and the side faces. The fitment of the cartridge may be recessed to allow for stacking ability of upper portions of cartridges, and for stacking ability of lower portions of cartridges.

In an aspect of the disclosure, the cartridge may have a fail-safe or mistake-proofing configuration. Another term that may be used to characterize the fail-safe of mistake-proofing configuration of the cartridge is poka-yoke. Channels and/or ridges in the top and bottom of the cartridge may be configured to match with a corresponding mating member in a cartridge frame or rack. In accordance with an aspect, a top channel or ridge and a bottom channel or ridge may be asymmetric with respect to each other to prevent a cartridge from being inserted upside down or some other incorrect position or orientation.

In accordance with an aspect, the cartridge may accommodate two different size fitments to prevent a liquid filled pouch being placed inside the cartridge in a manner that results in an incorrect fluid connection between the cartridge and a dispensing machine.

In an aspect of the disclosure, certain fitments may be color coded. For example, a first fitment may have a first color (such as black), and a second fitment may have a second color (such as blue). By way of example, the cartridge may have a first fitment colored black corresponding to an acid component for a beverage, and a second fitment colored blue for a flavor component of a beverage. The cartridges may be configured so that the cartridges do not fit into a cartridge frame backwards.

In an aspect of the disclosure, cartridges may be configured to only go in one way into a cartridge frame. In an aspect of the disclosure, cartridges may be configured to be shipped vertically. In an aspect of the disclosure, a shipping box design may be configured that shows the orientation of the cartridges to be shipped. For example, black arrows may be provided on the shipping box to show the orientation of the cartridges within the shipping box for ground delivery. In an aspect of the disclosure, it may be beneficial to ship cartridges horizontally, where permitted, to provide secondary containment. In an aspect of the disclosure, a secondary containment wall may be provided for shipment in the horizontal position. A horizontal position of a cartridge in a dispensing machine may allow for better evacuation of pouches inside the cartridge.

In accordance with an aspect of the disclosure, the cartridge may provide a hand and/or finger grab hold point or tab at the top and/or bottom of the cartridge. The hand and/or finger grab point may be at two or more corners of the cartridge. The hand and/or finger grab may be configured to allow at least a pull force of about 50 Newtons to be applied without damage to the container. In an aspect of the disclosure, a tab may be configured to provide increased strength to the cartridge. A tab may be configured to provide an integrated grip on the cartridge.

In an aspect of the disclosure, a cartridge is configured to be filled on commercially available equipment and/or machine. In an aspect of the disclosure, the cartridge may be configured to provide a membrane over a fitment to keep the fitment clean, e.g., free of dust. The membrane may comprise a dust cap. In an aspect of the disclosure, the cartridge may be configured to have a pull tab with the dust cap attached. In an aspect of the disclosure, the dust cap may be removed prior to inserting the cartridge into a dispensing machine. In an aspect, the membrane may have a fail-safe of mistake-proofing configuration to prevent cartridge insertion into a cartridge frame unless the dust cap is removed. In an aspect of the disclosure, a label may be provided over the tab or dust cap. The label may comprise instructions to a user to remove the dust cap.

In an aspect of the disclosure, a drip pan may be provided and placed below a cartridge(s) to collect any components that may spill. In an aspect of the disclosure, a tamper evident label may be provided with the cartridge. Thus, when the tamper evident label is torn off, wording underneath the label when it was placed on the cartridge may read "void." In an aspect of the disclosure, a chromatic ink may be placed on the cartridge, e.g., on a label placed on the cartridge that is configured to provide an indication if the cartridge is exposed to an unacceptable temperature. In an aspect of the disclosure, if a recipe is downloaded that calls for a cartridge that is not in a dispensing machine, then a user interface will not display that beverage for selection. In an aspect of the disclosure, if a recipe is downloaded that calls for a cartridge that is empty in a dispensing machine, then a user interface will not display that beverage for selection.

In an aspect of the disclosure, a reader in a dispensing system or a backroom may be configured to ensure that a component(s) is in the correct position. For example, a reader in a backroom may be configured to identify whether a cartridge comprising a high fructose corn syrup (HFCS) is in a correct position in the backroom or cartridge frame. An RFID tag or label on the cartridge or a nozzle may be used for this purpose. In an aspect of the disclosure, a sensor and/or reader and/or fail-safe or mistake-proofing configuration of the cartridge may be used to prevent cross-contamination of different components, e.g., different types of sweeteners. For example, an RFID tag or label sensor or sugar sensor may be used to ensure that a cartridge comprising a sugar sweetener is correctly positioned on a cartridge frame or rack.

In accordance with an aspect of the disclosure, foot rail spacing of a cartridge frame may be configured to be compatible with both "single" and "double" compartment cartridges while maintaining uniform fitment spacing. A latch mechanism may be provided to secure the cartridge in the frame or rack of cartridges. In accordance with an aspect of the disclosure, a latch mechanism may be provided that improves cartridge integrity and prevents fingers from tampering with the latch.

In accordance with an aspect of the disclosure, a fitment lead-in may be provided to assist pouch placement inside cartridge. Further, a latch target area may be increased or maximized to make it easy to close the cover. In accordance with an aspect, the cartridge is devoid of sharp edges that can damage the pouch.

In accordance with an aspect of the disclosure, cartridge shell parts may be configured so that they are capable of being machine manipulated on the filling line. The cartridge shell parts may be configured so that they can be stacked or nested but not "locked" between the cartridges. For example, in accordance with an aspect of the disclosure, at least three (3) cartridge shell parts may be stacked or nested without locking inside each other, with a bottom cartridge shell part, a middle cartridge shell part, and a top cartridge shell part, i.e., a stack ratio of at least 3:1, wherein each cartridges may be moved by hand away from an adjacent cartridge. With a stack ratio of at least 4:1, four (4) cartridge shell parts may be stacked or nested and take no more space than a two (2) cartridge shell parts that are not nested. Those of ordinary skill in the art will recognize that in accordance with the present disclosure, other suitable stacking ratios may be used.

In accordance with an aspect of the disclosure, at least six (6) cartridge shell parts (e.g., up to twelve (12) shell parts) may be stacked or nested without locking between the cartridges. For example, in accordance with an aspect of the disclosure, at least six (6) cartridge shell parts may be stacked or nested without locking inside each other, with a bottom cartridge shell part, at least four (4) intermediate cartridge shell parts, and a top cartridge shell part, i.e., a stack ratio of at least 6:1, wherein each cartridge may be moved by hand away from an adjacent cartridge.

In accordance with the disclosure, each cartridge shell part may comprise a rib. The rib may be configured to prevent a cartridge shell part from sticking to an adjacent nested cartridge shell part. In accordance with the disclosure, a cartridge may comprise a top shell part and a bottom shell part. Each top cartridge shell part may be configured to be nested with another top cartridge shell part. Each bottom cartridge shell part may be configured to be nested with another bottom cartridge shell part. A stack or set of four nested cartridge shell parts, for example, may be about three to four feet high, and provided in a sleeve or stack. The sleeves or stacks may be loaded into automatic pick and place equipment. In accordance with an aspect of the disclosure, each cartridge may not have a hinge. In accordance with aspects of the disclosure identified above, the cartridges provide several benefits over conventional cartridges. For example, the cartridges of the present disclosure may provide better molding stability and easier stacking or nesting than for conventional cartridges and easier pouch placement than bag placement for bag-in-box configurations for conventional dispensers.

In accordance with aspects of the disclosure, a cartridge may be laid down on an elongated side or bottom of the cartridge, e.g., for lower quantity shipments. In accordance with an aspect of the disclosure, a cartridge may be configured to be laid on an end for higher quantity shipments.

In accordance with aspects of the disclosure, material cost per unit of cartridge may be relatively low. As previously noted, in an aspect of the disclosure a cartridge comprises a thermoplastic, e.g., a high density polyethylene polymer ("HDPE") and/or polyethylene terephthalate ("PET"), and/or polypropylene (PP) may be low cost per unit materials compared to other thermoplastics, e.g., a polycarbonate.

In accordance with an aspect of the disclosure, a cartridge may be configured to provide leak resistance. In an aspect, the cartridge may comprise a tongue and groove combination, the combination configured to provide a difficult leak path to impede or reduce leaking from the cartridge. In accordance with an aspect of the disclosure, a pouch maintained in the cartridge may be configured to have a lower number of seams than a bag in a conventional bag-in-box configuration. For example, in accordance with an aspect of the disclosure, a pouch in a cartridge of the present disclosure may be configured to have four (4) seams as opposed to six (6) seams for a bag in a conventional bag-in-box configuration. Typically, the lower the number of seams, the less likely that a pouch will leak.

In accordance with an aspect of the disclosure, a cartridge may be configured to maintain a pillow pouch. A pillow pouch may be less expensive to make and/or use in a dispensing system than a conventional bag in a conventional cartridge of a conventional dispensing system. A pillow pouch may be made of similar material as a conventional bag and/or have similar surface type as a conventional bag. By relocating a fitment from the center of a pouch to the bottom of the pouch in accordance with an aspect of the present disclosure, better evacuation of fluid out of the pouch is obtained. For example, by having a side by side dual cartridge, each side may have a fitment at the bottom of a pouch in accordance with aspects of disclosure. This construction provides evacuation of fluid out of the dual cartridges, i.e., greater than 97%. In accordance with the present disclosure, a gusset pouch can be stood upright and provide an evacuation channel that may improve evacuation of fluid from the pouch. The gusset pouch may have a suitable number of seams. The gusset pouch may have six (6) seams.

In accordance with an aspect of the disclosure, a plurality of cartridges may be configured to be stackable. For example, the cartridges may be configured to be stackable when empty.

In accordance with an aspect of the disclosure, a cartridge may be configured to have improved grip and/or latch features than in a conventional cartridge. In accordance with an aspect of the disclosure, a cartridge may be configured to provide a pouch fit within the cartridge that is tighter than a bag fit within a conventional BIB, thereby reducing abrasion of the pillow pouch maintained in the cartridge of the present disclosure. The cartridge may comprise a fitment outlet at the bottom of the housing. The fitment outlet may be configured to receive fluid from a pouch maintained within the housing.

In accordance with an aspect of the disclosure, a cartridge may be configured to provide larger label surfaces than those provided with a conventional cartridge. For example, a cartridge in accordance with the disclosure may provide a label surface of about 6 inches×2.5 inches).

A cartridge may be configured to comprise a housing. The housing may be configured to maintain a pillow or gusseted pouch within the housing. The cartridge may comprise a fitment outlet at the bottom of the housing. The fitment outlet may be configured to receive fluid from a pillow pouch maintained within the housing.

In an embodiment, the cartridge may be stackable. Thus, at least a first cartridge may be stacked on a second cartridge. The second cartridge may be configured to have a structure that corresponds to a structure of the first cartridge.

In accordance with the disclosure, a dispensing system may include tracking of cartridge exposure temperature. For example, a cartridge comprising an ingredient component for a free-flowing food product may further comprise a temperature sensor that indicates exposure temperature of each cartridge. Those of skill in the art will recognize that in accordance with this disclosure the temperature sensor may comprise any suitable temperature sensor, e.g., a thermometer and/or a material that exhibits a color change due to a change in temperature (e.g., a thermochromatic liquid crystal or a leuco dye). The temperature sensor may be used to track surface temperature of the cartridge. The temperature sensor may also be used to track the temperature exposure of an ingredient component for a free-flowing food product in the cartridge. The temperature sensor may be located on the cartridge or located in the dispensing system at a location other than on the cartridge. The temperature reading(s) monitored by the temperature sensor may be transmitted to an RFID tag or label, for example, an RFID tag or label on the cartridge. The temperature reading(s) transmitted to the RFID tag or label may be read or downloaded from the RFID tag or label by a reader and transmitted to a server.

Consumption of the ingredient component or level of the ingredient component in a cartridge may be monitored by a consumption or level sensor. The consumption or level may be encoded on an RFID tag or label, such as an RFID tag or label on the cartridge. The consumption or level reading(s) encoded on the RFID tag or label may be read or downloaded from the RFID tag or label by an RFID reader and transmitted to a server.

The server may be configured to receive communications, including temperature reading(s) with respect to at least one cartridge. A processor may be configured to process the communications and write back to an RFID tag or label on the at least one cartridge a communication to indicate at the RFID tag or label whether or not the temperature reading(s) is within specification. The processor may be located remote from the cartridge, e.g., at a warehouse or shipping vehicle. The system may be configured to provide an update RFID tag(s) or label(s). The system may be configured to provide throughout the supply chain update RFID tags or labels.

The system may be configured to monitor when a cartridge may be near or approaching a pre-determined date of last use, e.g., a recommended date of last use from the date the ingredient component in the cartridge is made and/or is placed in the cartridge. The system may be configured to write a byte or other communication to the cartridge if the cartridge is out of date or exposed to an undesirable temperature. The system may be configured to place an identification on the cartridge or an RFID tag or label on the cartridge when the cartridge is out of date or exposed to an undesirable temperature. The system may be configured to prevent dispensing of an ingredient from a cartridge that is out of date or has been exposed to an undesirable temperature. For example, the system may be configured to lock-out the cartridge or prevent dispensing from the cartridge.

For instance, the system may be configured to prevent a cartridge that is out of date or has been exposed to an undesirable temperature to be inserted or reinserted into a dispensing machine or in fluid communication with a dispenser. The system may be configured to identify when a cartridge is out of date or has been exposed to an undesirable temperature, e.g., placing a marking or electronic message on the cartridge.

The system may be configured to use an suitable code, e.g., a code on an RFID tag or label, bar code, infrared code (IR), on or in a container, e.g., in between cup paper layers for the dispensing of a free-flowing food product or ingredients into the container. For example, the system may be configured to read an RFID tag or label on or in a container and provide instructions and/or control operation of device(s) to dispense a free-flowing food product or ingredients into a container in accordance with the read RFID tag or label.

The system may be configured to track each pouch separately that may be placed in a cartridge.

The system may be configured to allow for an RFID and/or other code reader to interface with a user, e.g., near field communication (NFC). For example, the system may be configured to identify a code on an RFID tag or label or other code associated with a mobile device. The system may be configured to bill a user for items purchased using the system, e.g., bill a credit card of the user in accordance with a verification code entered by the user.

Those of skill in the art will recognize that in accordance with the disclosure, a RFID tag or label may comprise an RFID chip. While an RFID chip may be used in accordance with the disclosure, those of skill in the art will recognize that instead of an RFID chip, any suitable chip may be used. For example, an RFID tag or label may comprise a one wire or a two wire chip The system may be configured to place the system or a portion of the system into a cleaning mode. For example, a cleaning cartridge may be placed in the system and/or operatively connected to the system, wherein an RFID tag or label associated with the cleaning cartridge is read by the system and the system or a portion of the system goes into a cleaning mode. The system may be configured to have an automatic closed loop program wherein the system or a portion of the system transfers a cleaning fluid (i.e., a gas or a liquid) from the cleaning cartridge through at least one portion of the system to clean and/or purge any materials within the at least one portion of the system.

The system may be configured to comprise a screen wand. The screen wand may be a tool with an RFID tag or label that puts a screen in a predetermined mode, e.g., a cleaning mode to allow the screen to be cleaned. An interactive cleaning tool may be configured to provide instructions to an operator or user how to how to disassemble the nozzle and clean the system or machine properly. The interactive cleaning tool may be used for touchup and/or intermediate cleanings throughout the day. The system or machine may comprise a cleaning timer(s) and/or a video(s) that may provide instructions to an operator or user how to clean the system or machine. A reader may be placed at a dispense point of the system or machine, and the reader may be configured to read a signal or code, and wherein a controller or processor places the system into a cleaning mode upon reading of the signal or code by the reader. In an aspect, the system may go into a cleaning mode when a cup having a RFID tag or label or other code (e.g., a bar code) associated with a cleaning mode is placed sufficiently close to the reader, e.g., under a nozzle, so that the reader reads the code, and that code is then transmitted to the controller or processor of the system, which then places the system into the cleaning mode upon receipt of the code from the reader.

In an aspect, a high frequency chip(s) may be used in connection with operation of the system to eliminate cross talk. In an aspect, the system may be configured to use an RFID reader to search for and identify an RFID tag(s) or label(s) in a local area, e.g., the area of a beverage dispenser. In an aspect, an RFID tag or label and/or other code may be used to identify and track a cartridge prior to installation of the cartridge in a frame of the system, and throughout operation of the cartridge in the system, and after the cartridge has been removed from the frame of the system, e.g., identify or confirm when a cartridge has been removed from the frame.

The system may be configured to track what is in the cartridge, the amount of material in the cartridge, date of the cartridge, length of time the cartridge has been installed in the system, a lock code(s) on the cartridge, and a serialized identification number. The system may be configured to read a code on or otherwise associated with a cartridge. Upon reading the code, the system may be configured to unlock a front panel. Upon unlocking of the front panel, a visual and/or or audio signal advises a user of a location where the cartridge should be placed on a frame or rack. The visual and/or audio signal may advise a user of the correct location for the cartridge when the cartridge is placed at a distance sufficiently close to a reader associated with the correct location for the cartridge. The reader may be configured to read a code associated with the cartridge and generate the visual and/or audio signal when the code associated with the cartridge corresponds to the cartridge to be used for the location on the frame or rack. The system may be configured to allow a panel to open and for a spent cartridge to be unlocked and removed from the frame and rack, and allow for a new cartridge to be placed on the frame or rack where the spent cartridge was previously placed.

In an aspect, a partial locking mechanism may be provided. The partial locking mechanism may be configured to allow for the cartridge to be pulled slightly out and then unlock when new cartridge is registered (reader located in the slot). If a cartridge is validated by the system, the partial locking mechanism unlocks a restriction and allows the new cartridge to be inserted and engaged fully with a nozzle.

In an aspect, the system may be configured to allow a cartridge to fully slide into a slot and an RFID tag or label on the cartridge may be read by an RFID reader. A nozzle may be provided that is configured to tilt back away from the cartridge. Once validated by the system, the system may allow the cartridge to be locked into place, and the nozzle to be physically inserted or otherwise moved in fluid communication with the cartridge.

In an aspect, the system may be configured to provide an RFID reader to open a machine or device upon reading a predetermined RFID tag or label. In an aspect, the system may be configured to identify and validate a cartridge. In an aspect, the system may be configured to allow insertion of the cartridge into system without cross contamination between a component in the cartridge and a different component outside the cartridge. In an aspect, the system may comprise two RFID readers, one RFID reader associated with a controller configured to unlock a door or panel, and the other RFID reader associated with a controller configured to unlock a cartridge from a shelf of a frame or rack.

In an aspect, a central RFID reader may be used to put a machine in maintenance mode or diagnostic mode. The central RFID reader may be configured to read an RFID tag or label on a container, e.g., a cup.

In an aspect, the system may be configured to receive and transmit a signal to a cartridge that corresponding to fill level, data inserted, or other information communicated through a smart network to determine the life cycle of cartridge, and to detect if the cartridge trying to be refilled.

In an aspect, a cleaning cartridge may comprise an RFID tag or label. The system may be configured to track a cleaning process, and determine that the cleaning process has been completed with the cleaning cartridge is empty, and that a predetermined amount of water has also passed through machine. The machine may be configured to go into a clean mode, whereupon dispensing is halted during the cleaning process.

Figure 2:
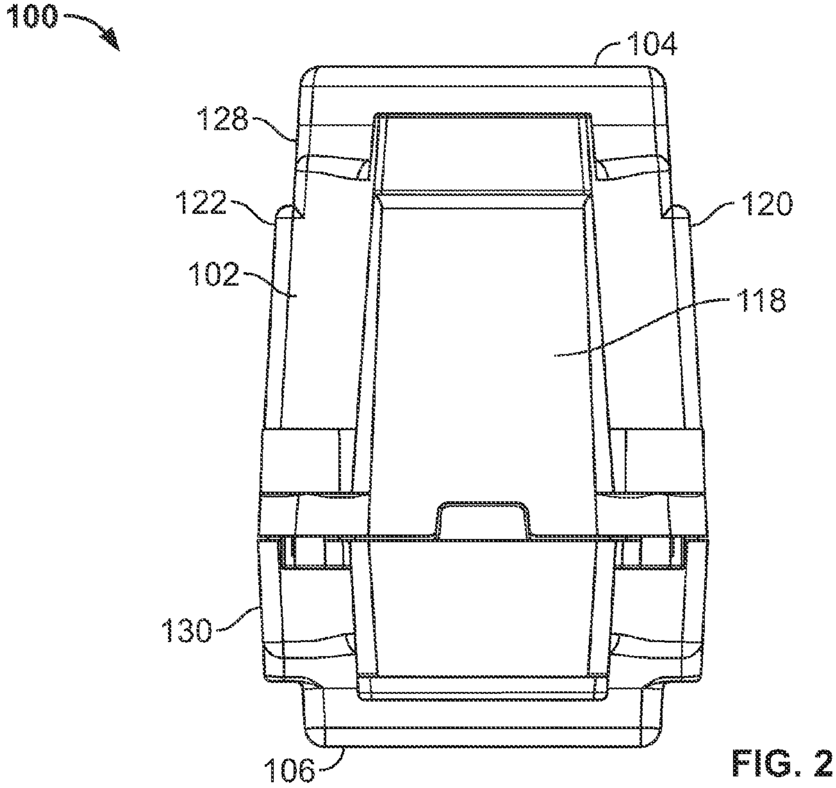
FIG. 2 is a back view of the cartridge shown in FIG. 1 in accordance with aspects of the disclosure.

FIG. 1 is a front view of cartridge 100 in accordance with various aspects of the disclosure. Cartridge 100 comprises a housing 102. Housing 102 is configured to maintain a pouch (not shown in FIG. 1) within housing 102. Cartridge 100 comprises a top 104 and a bottom 106. Cartridge 100 comprises at least one top mating member 108 at top 104, and at least one bottom mating member 110 at bottom 106. Top mating member 108 is asymmetric with the at least one bottom mating member 110. Each mating member is configured to match with a corresponding mating member of a cartridge frame or rack (not shown in FIG. 1). Cartridge 100 defines an opening 112. Opening 112 may be configured to allow for a connection, e.g., tubing, between a pouch in cartridge 100 and a dispenser. Cartridge 100 may comprise a stop plate 114. Stop plate 114 may be configured to abut against a corresponding stop plate of a frame or rack (not shown in FIG. 1), thereby stopping movement of cartridge 100 into a frame or rack so that opening 112 is a predetermined distance within the frame or rack. As shown in FIG. 1 and FIG. 2, cartridge 100 comprises a front 116 and a back 118, and sides 120, 122.

Cartridge 100 may comprise an upper portion 128 and a lower portion 130. Upper portion 128 and lower portion 130 may in combination define opening 112. Those of skill in the art will recognize that in accordance with the disclosure, upper portion 128 and lower portion 130 may be connected to each other using any suitable connection structure. For example, but not by limitation, fasteners 132 may be used to connect upper portion 128 with lower portion 130, as shown in FIG. 5.

Figure 3:
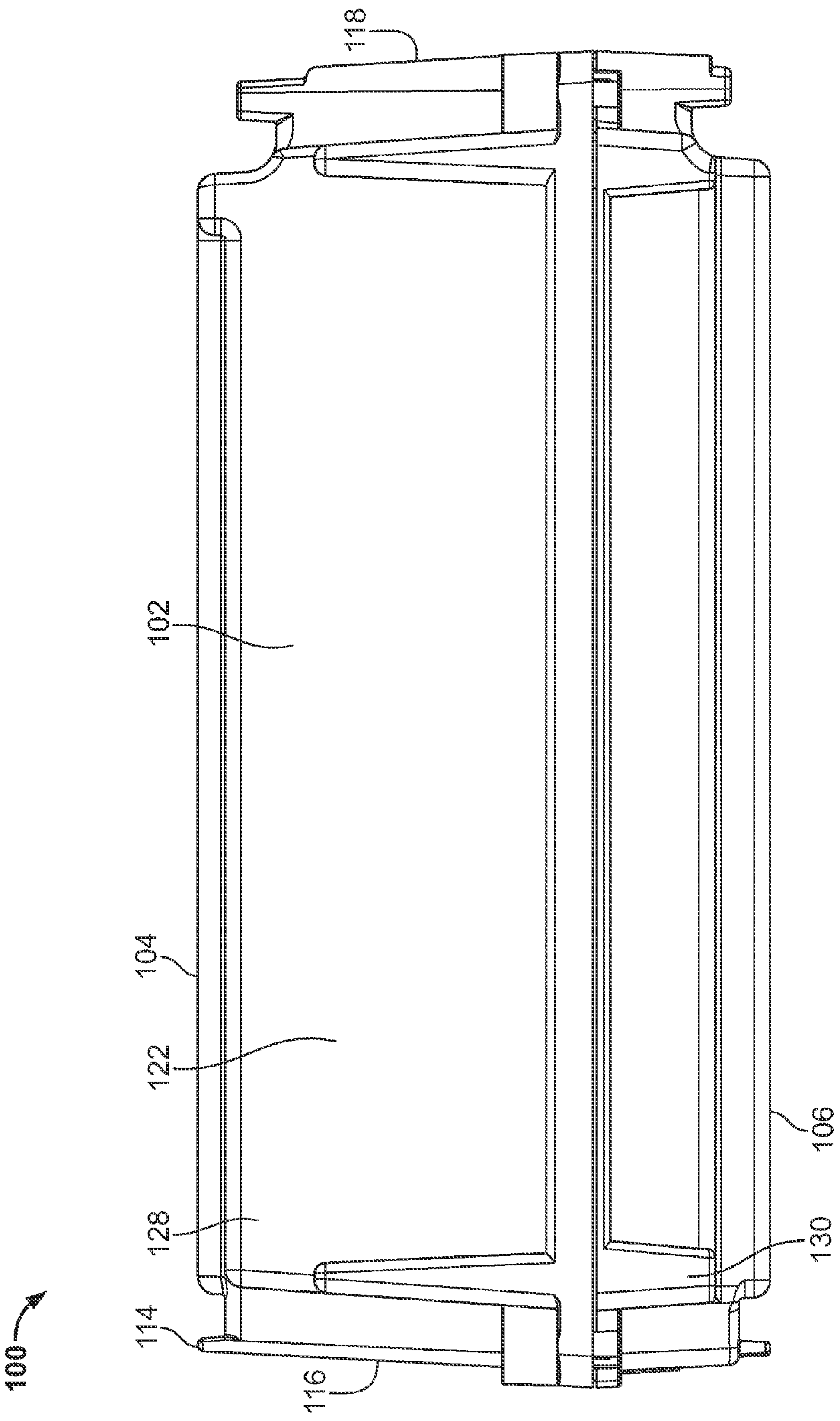
FIG. 3 is a right side view of the cartridge shown in FIG. 1 in accordance with aspects of the disclosure.
Figure 4:
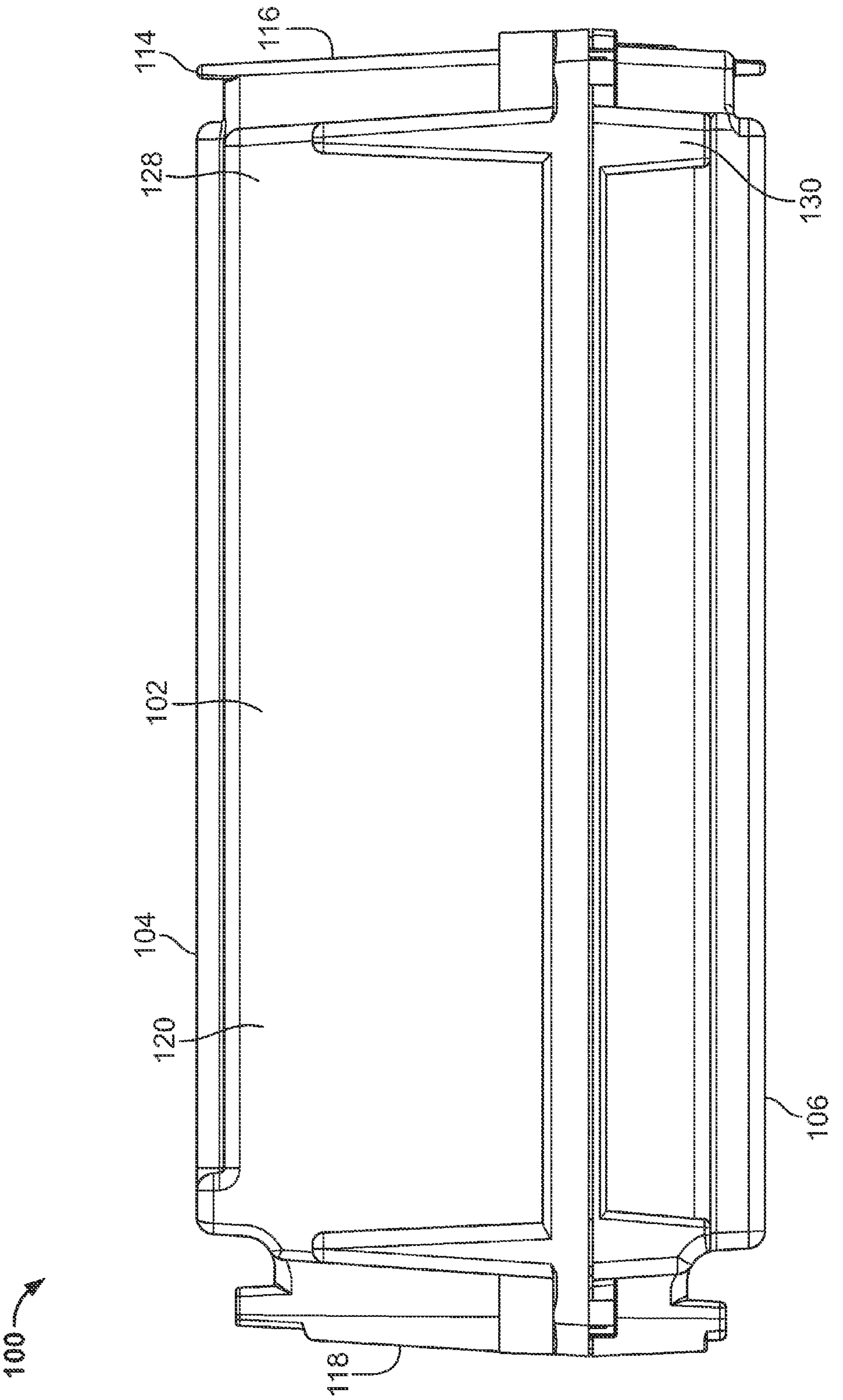
FIG. 4 is a left side view of the cartridge shown in FIG. 1 in accordance with aspects of the disclosure.

FIG. 2 is a back view of the cartridge shown in FIG. 1 in accordance with aspects of the disclosure. FIG. 3 is a right side view of the cartridge shown in FIG. 1 in accordance with aspects of the disclosure. FIG. 4 is a left side view of the cartridge shown in FIG. 1 in accordance with aspects of the disclosure.

Figure 5:
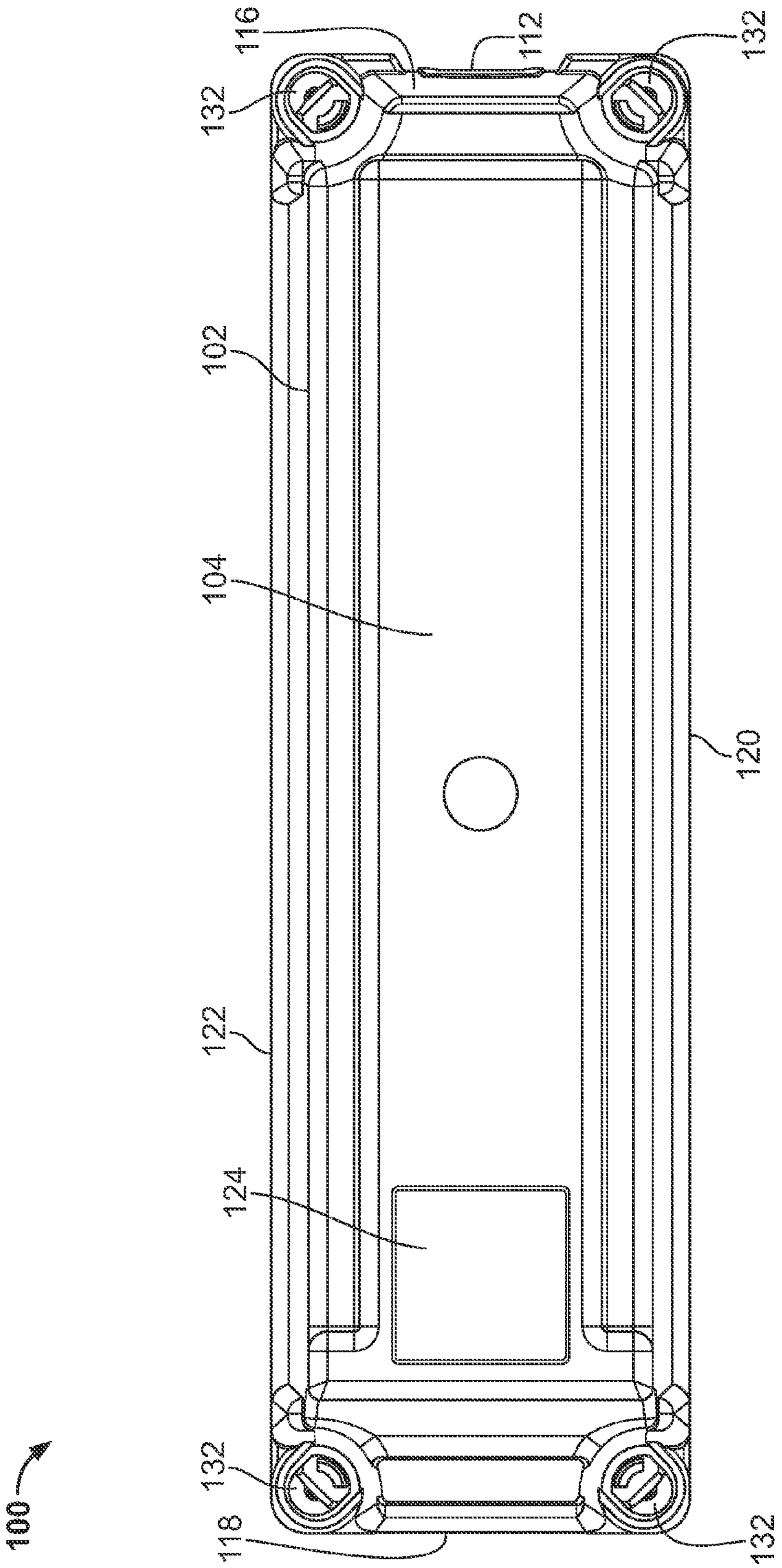
FIG. 5 is a top view of the cartridge shown in FIG. 1 in accordance with aspects of the disclosure.
Figure 6:
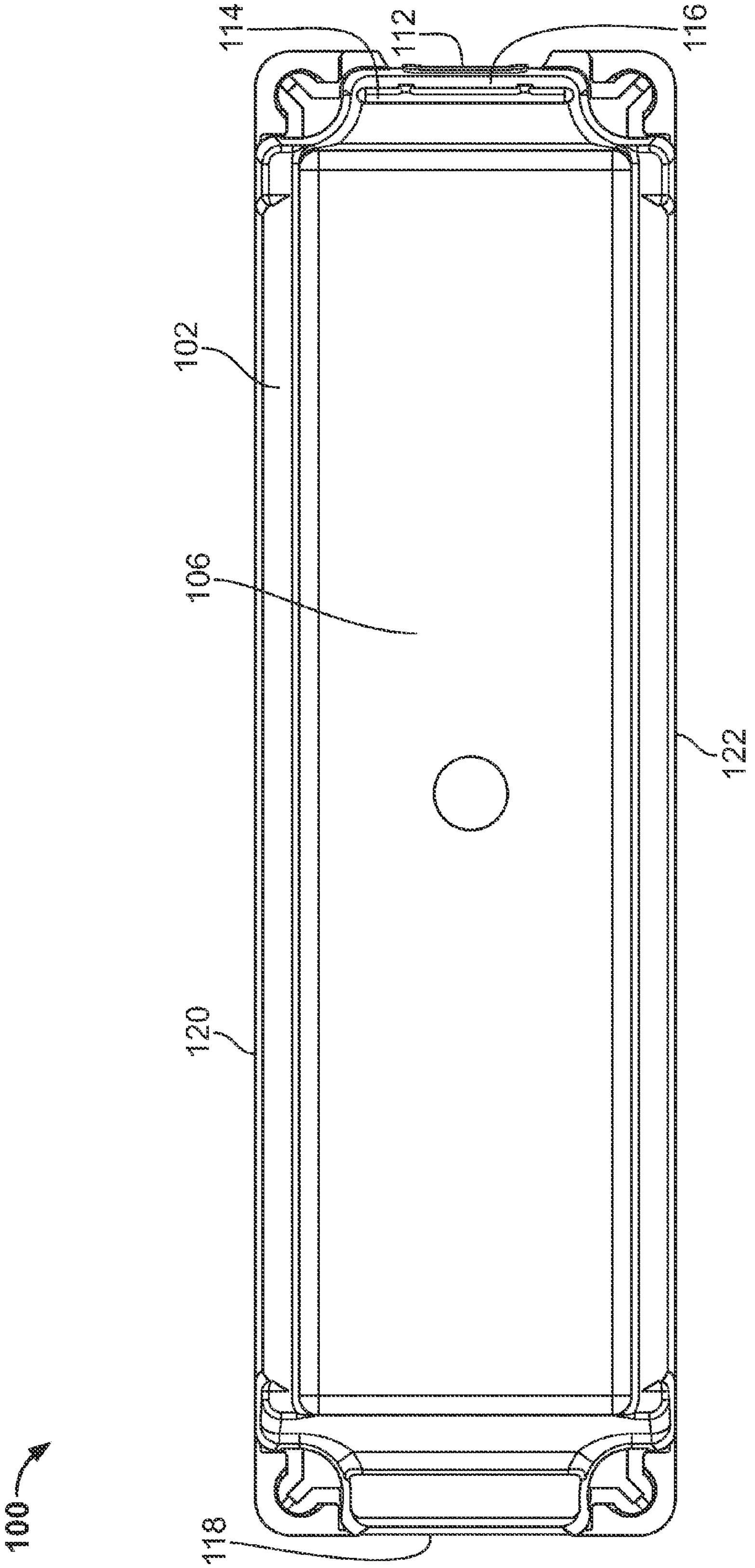
FIG. 6 is a bottom view of the cartridge shown in FIG. 1 in accordance with various aspects of the disclosure.
Figure 7:
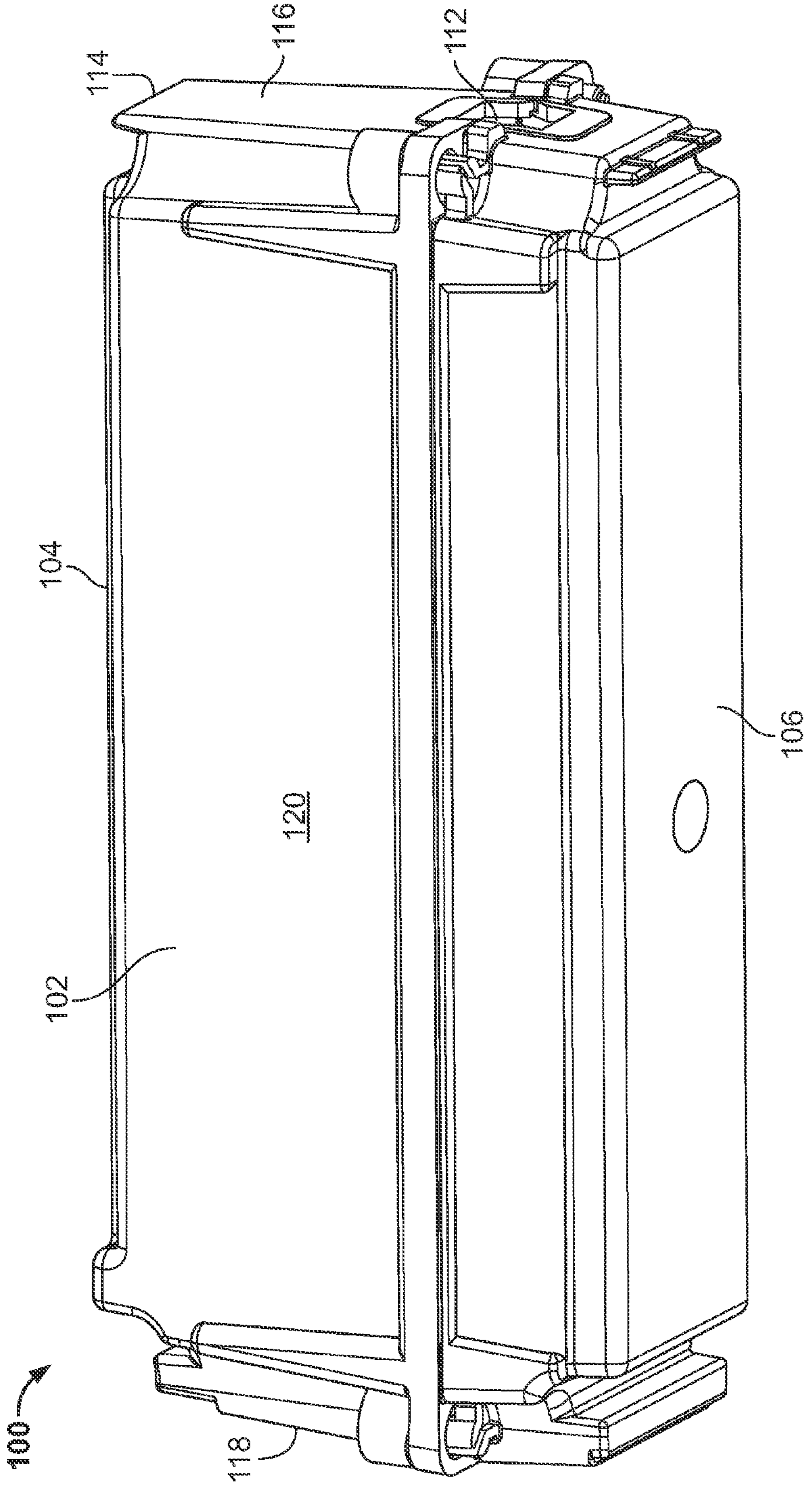
FIG. 7 is a bottom, front, left perspective view of the cartridge shown in FIG. 1 in accordance with various aspects of the disclosure.
Figure 8:
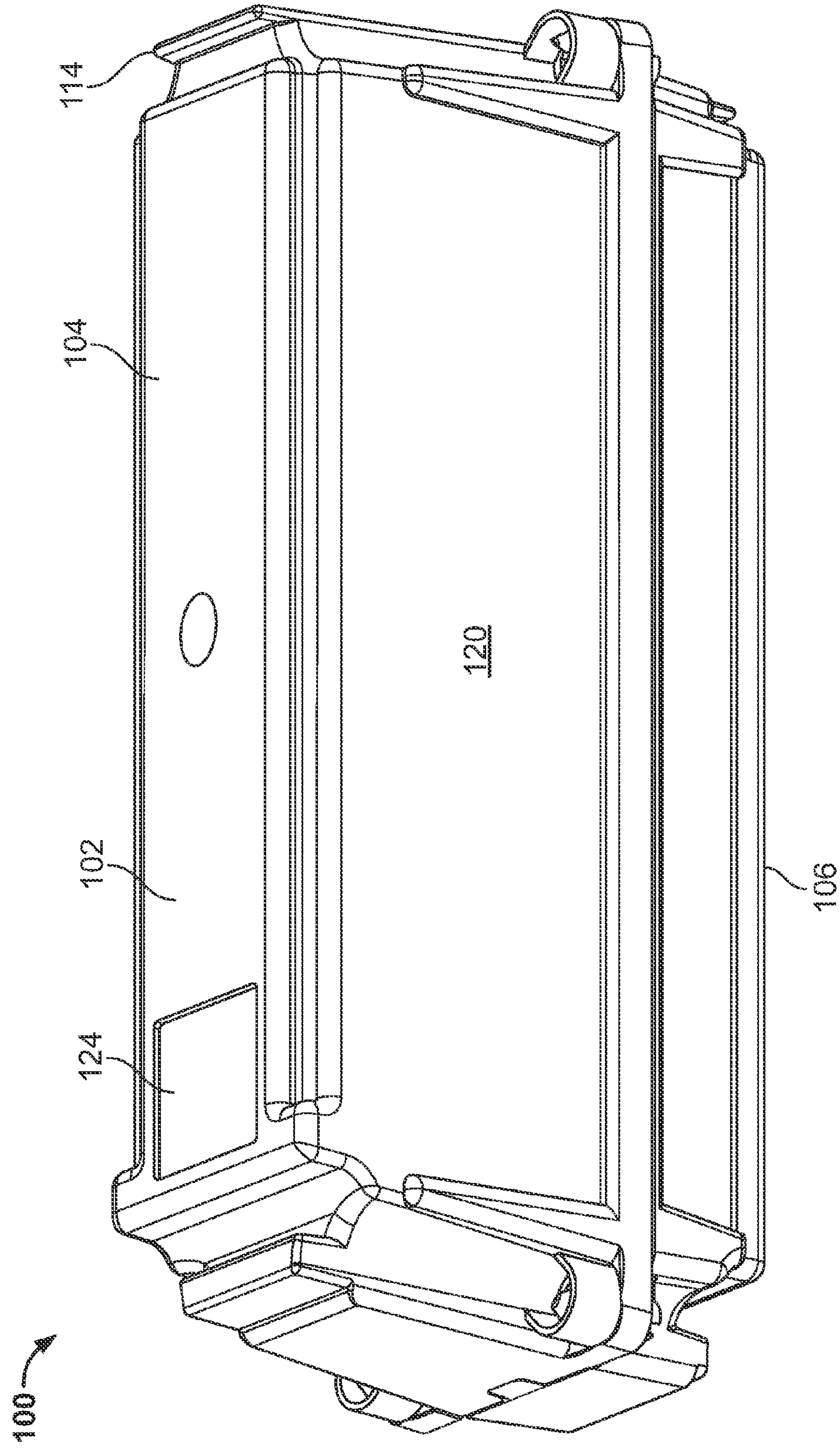
FIG. 8 is a top, rear, right perspective view of the cartridge shown in FIG. 1 in accordance with aspects of the disclosure.

FIG. 5 is a top view of the cartridge shown in FIG. 1 in accordance with aspects of the disclosure. Top 104 may comprise a label box or window 124. A label can be placed in label box 124, the label comprising a code or other identification that corresponds to a component maintained in within cartridge 100. FIG. 6 is a bottom view of the cartridge shown in FIG. 1 in accordance with various aspects of the disclosure. FIG. 7 is a bottom, front, left perspective view of the cartridge shown in FIG. 1 in accordance with various aspects of the disclosure. FIG. 8 is a top, rear, right perspective view of the cartridge shown in FIG. 1 in accordance with aspects of the disclosure.

Figure 9A:
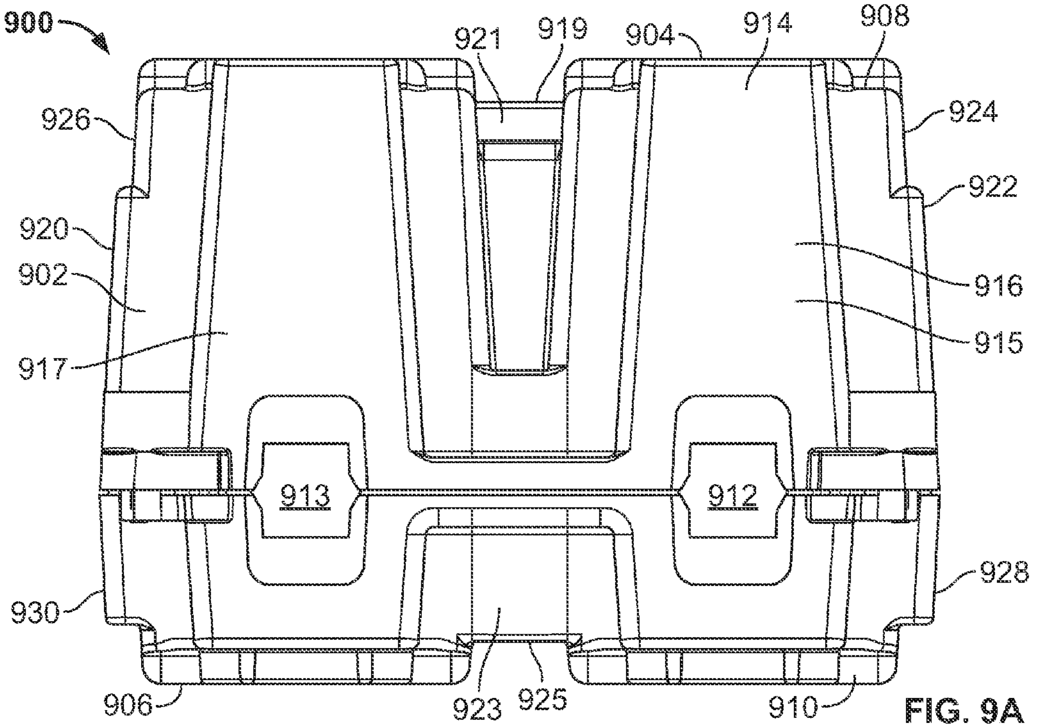
FIG. 9A is a front view of a dual cartridge in accordance with various aspects of the disclosure.
Figure 10:
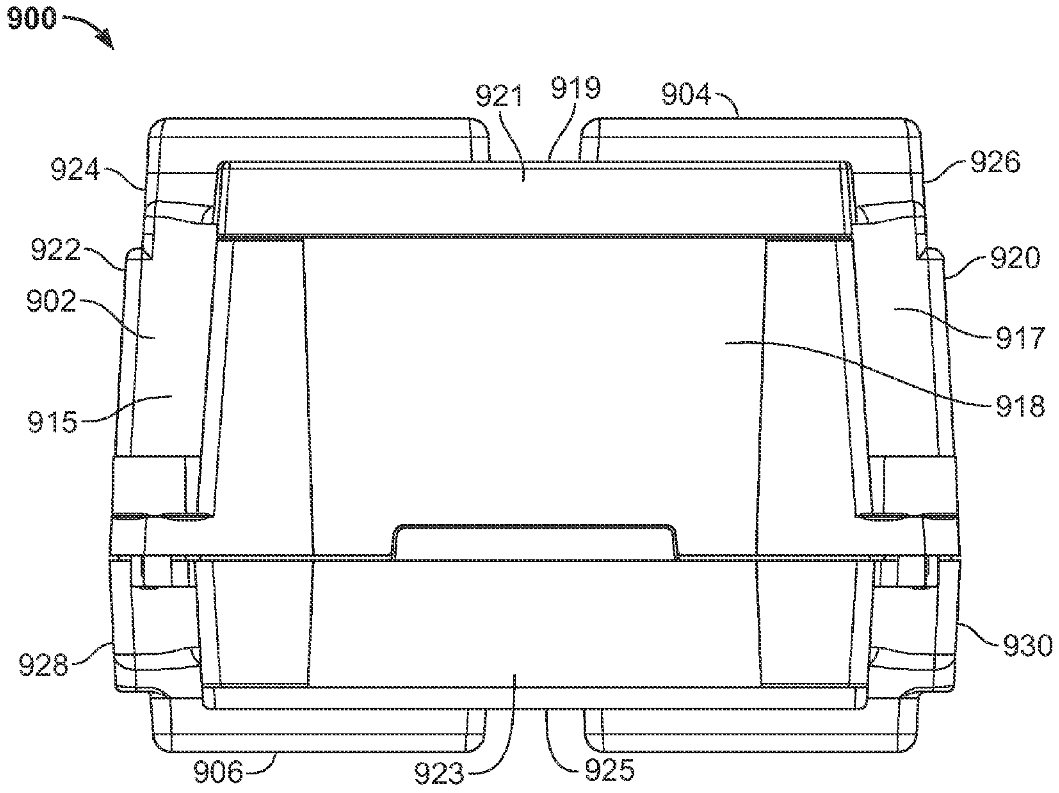
FIG. 10 is a back view of the dual cartridge shown in FIG. 9A in accordance with aspects of the disclosure.

FIG. 9A is a front view of a cartridge 900 in accordance with various aspects of the disclosure. Cartridge 900 comprises a housing 902. Housing 902 is configured to maintain two pouches (not shown in FIG. 9A) within housing 902. Cartridge 900 comprises a top 904 and a bottom 906. Cartridge 900 comprises at least one top mating member 908 at top 904, and at least one bottom mating member 910 at bottom 906. Top mating member 908 is asymmetric with the at least one bottom mating member 910. Each mating member is configured to match with a corresponding mating member of a cartridge frame (not shown in FIG. 9A). Cartridge 900 defines two openings 912 and 913. Opening 912 may be configured to allow for a connection, e.g., tubing, between a pouch in compartment 915 of dual cartridge 900 and a dispenser. Opening 913 may be configured to allow for a connection, e.g., tubing, between a pouch in compartment 917 of cartridge 900 and a dispenser. Cartridge 900 may comprise a stop plate 914. Stop plate 914 may be configured to abut against a corresponding stop plate of a frame or rack (not shown in FIG. 9A), thereby stopping movement of cartridge 900 into a frame or rack so that opening 912 and opening 913 are each a predetermined distance within the frame or rack. As shown in FIG. 9A and FIG. 10, cartridge 900 comprises a front 916 and a back 918, and sides 920, 922. Cartridge 900 has similar aspects as cartridge 100 previously discussed in connection with FIG. 1 through FIG. 8.

Figure 9B:
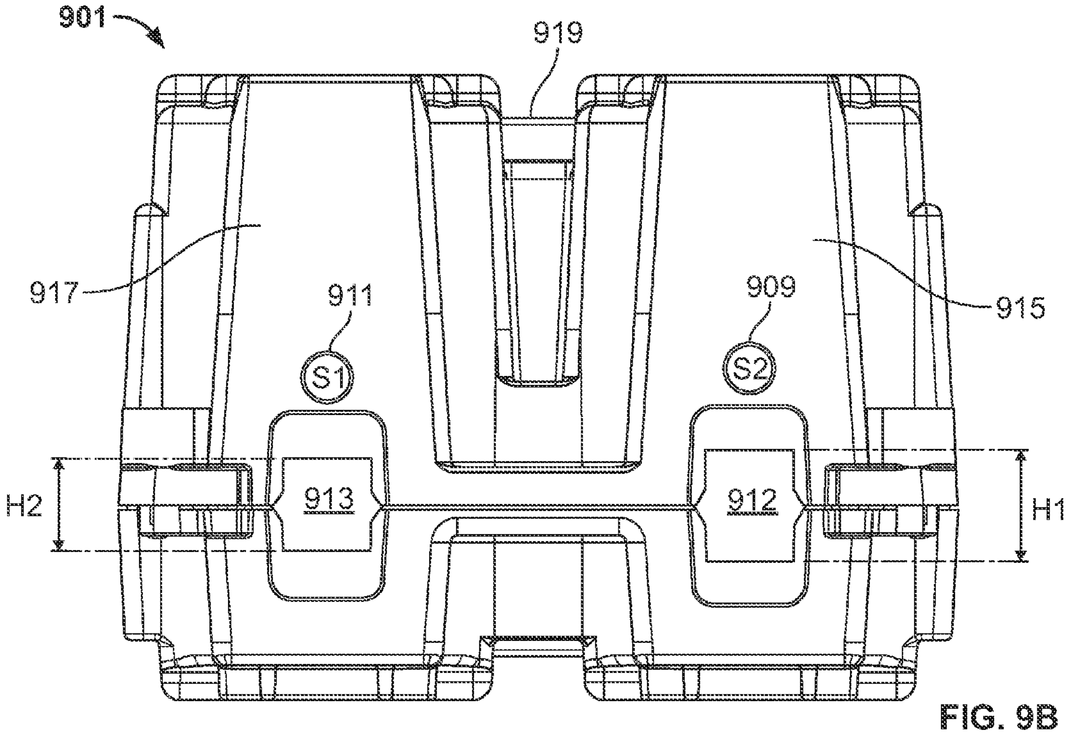
FIG. 9B is a front view of a dual cartridge in accordance with various aspects of the disclosure.

Unlike cartridge 100 which has a single compartment and defines a single opening 122, cartridge 900 has two separate compartments, wherein each separate compartment 915, 917 is configured to hold or maintain a pouch. Further, each separate compartment has a corresponding opening 912, 913, respectively. Thus, cartridge 900 may be characterized as a dual cartridge. Opening 912 and opening 913 may have same dimensions as shown in FIG. 9A. FIG. 9B illustrates cartridge 901 that is the same as cartridge 900 shown in 9A, with the exception that for cartridge 901, opening 912 and opening 913 have different dimensions. For example, opening 912 may have dimensions similar or the same as opening 1712, and opening 913 may have the dimensions similar or the same as opening 1713 as discussed below in connection with FIG. 18. As shown in FIG. 9B, one or more designation(s) 909 and 911, e.g., S2 and S1, may be placed over opening 912 and 913, respectively to designate the size of the fitment and/or component pouch that corresponds to that opening. The designations 909 and 911, e.g., "S2" and "S1," may be embossed on the cartridge. Designations 909 and 911 may have different colors. For example, "S2" of designation 909 may be black in color, and "S1" of designation 911 may be blue in color. In an aspect, opening 912 may be larger than opening 913. In FIG. 9B, opening 912 has a height H1 (e.g., 14.5 mm), opening 913 has a height H2 (e.g., 12 mm), and H1 is greater than H2. In FIG. 9B, opening 912 and opening 913 have the same width, e.g., 12 mm. A pouch fitment that corresponds to opening 912 in FIG. 9B will fit opening 912 but not fit opening 913 in FIG. 9B. This configuration provides a fail-safe design so that a pouch intended to be placed in the cartridge with its fitment corresponding to opening 912, i.e., compartment 915, cannot be placed in the cartridge with its fitment corresponding to opening 913, i.e., compartment 917. By way of example, but not limitation, a pouch comprising an acid (e.g., citric acid and/or phosphoric acid as a beverage component) and a fitment corresponding to opening 912 can be placed in compartment 915, but not compartment 917. A pouch comprising a flavor component (e.g., cola flavor) and a fitment corresponding to opening 913 can be placed in compartment 917.

Cartridge 900 may comprise an upper portion 921. Upper portion 921 may comprise a right upper portion 924, a left upper portion 926, and a connection member 919, which connects right upper portion 924 to left upper portion 926 of cartridge 900. Upper portion 921 may be a unitary piece. For example, upper portion 921 may be a unitary, molded plastic.

Cartridge 900 may comprise a lower portion 923. Lower portion 923 may comprise a right lower portion 928, a left lower portion 930, and a connection member 925, which connects right lower portion 928 to left lower portion 930 of cartridge 900. Lower portion 923 may be a unitary piece. For example, lower portion 923 may be a unitary, molded plastic.

Figure 13:
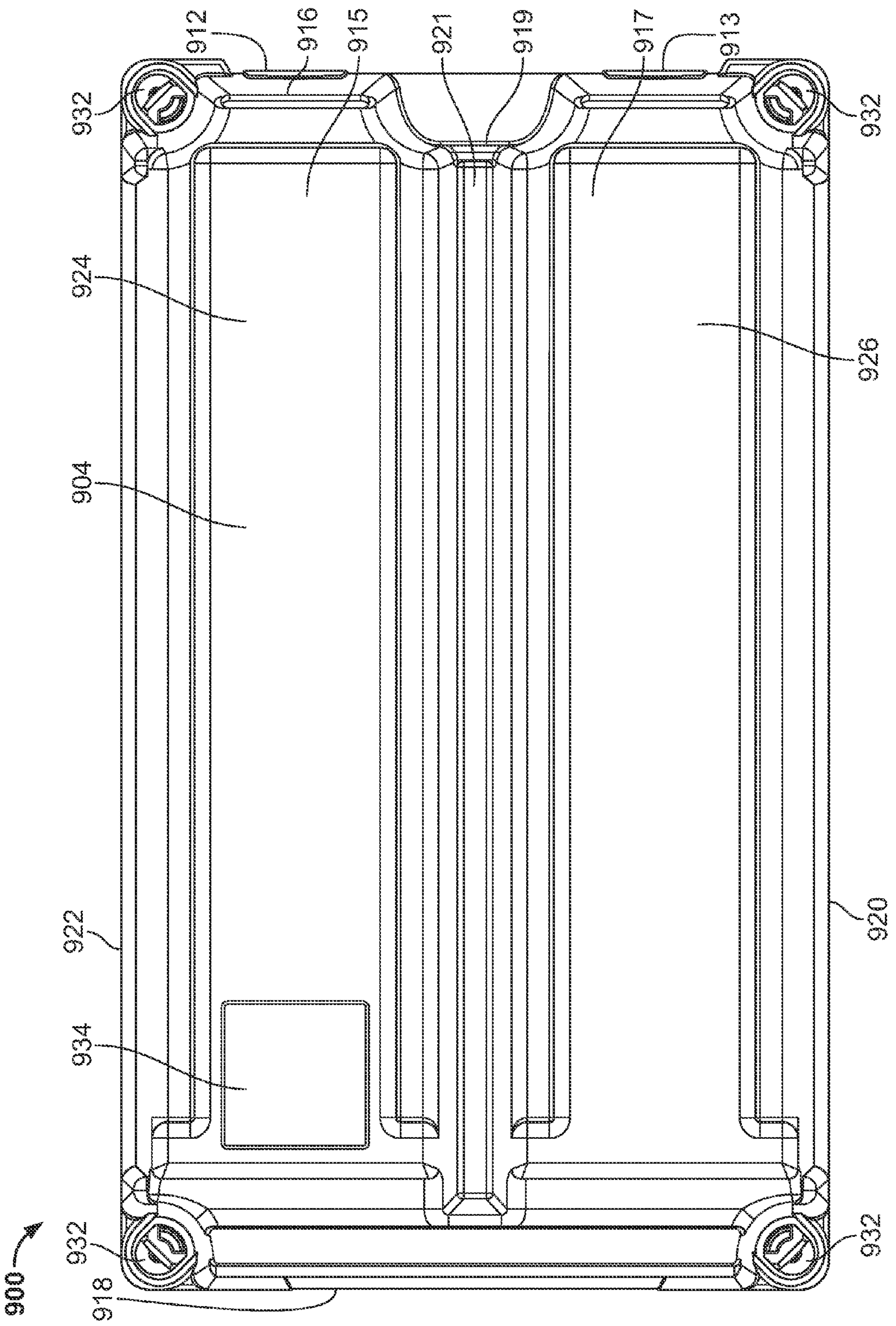
FIG. 13 is a top view of the dual cartridge shown in FIG. 9A in accordance with aspects of the disclosure.

As shown in FIG. 13, top 904 may comprise a label box or window 934. A label can be placed in label box 934, the label comprising a code or other identification that corresponds to at least one component maintained in within cartridge 900. In an embodiment, a label placed in label box comprises a code or other identification that corresponds to a first component maintained in a pouch in compartment 915, and a second component maintained in a pouch in compartment 917. Those of ordinary skill in the art will recognize that in accordance with the disclosure, the first component and the second component may be the same or different, and each component may be a component for a free-flowing product, such a free-flowing food product, e.g., a beverage.

Upper portion 921 and a lower portion 923 may in combination define openings 912 and 913. Those of skill in the art will recognize that in accordance with the disclosure, upper portion 921 and lower portion 923 may be connected to each other using any suitable connection structure. For example, but not by limitation, fasteners 932 may be used to connect upper portion 921 with lower portion 923, as shown in FIG. 13.

Figure 11:
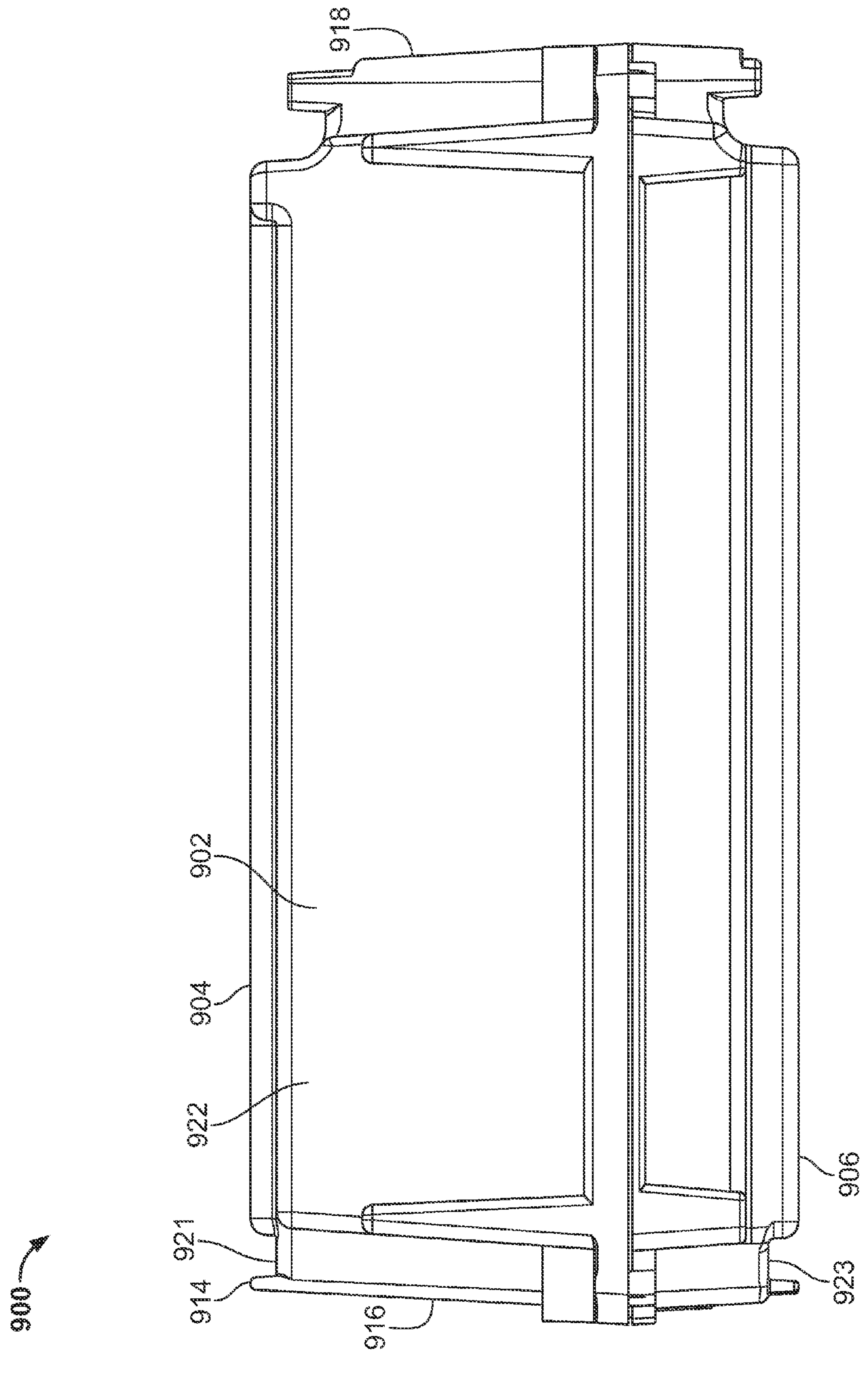
FIG. 11 is a right side view of the dual cartridge shown in FIG. 9 in accordance with aspects of the disclosure.
Figure 12:
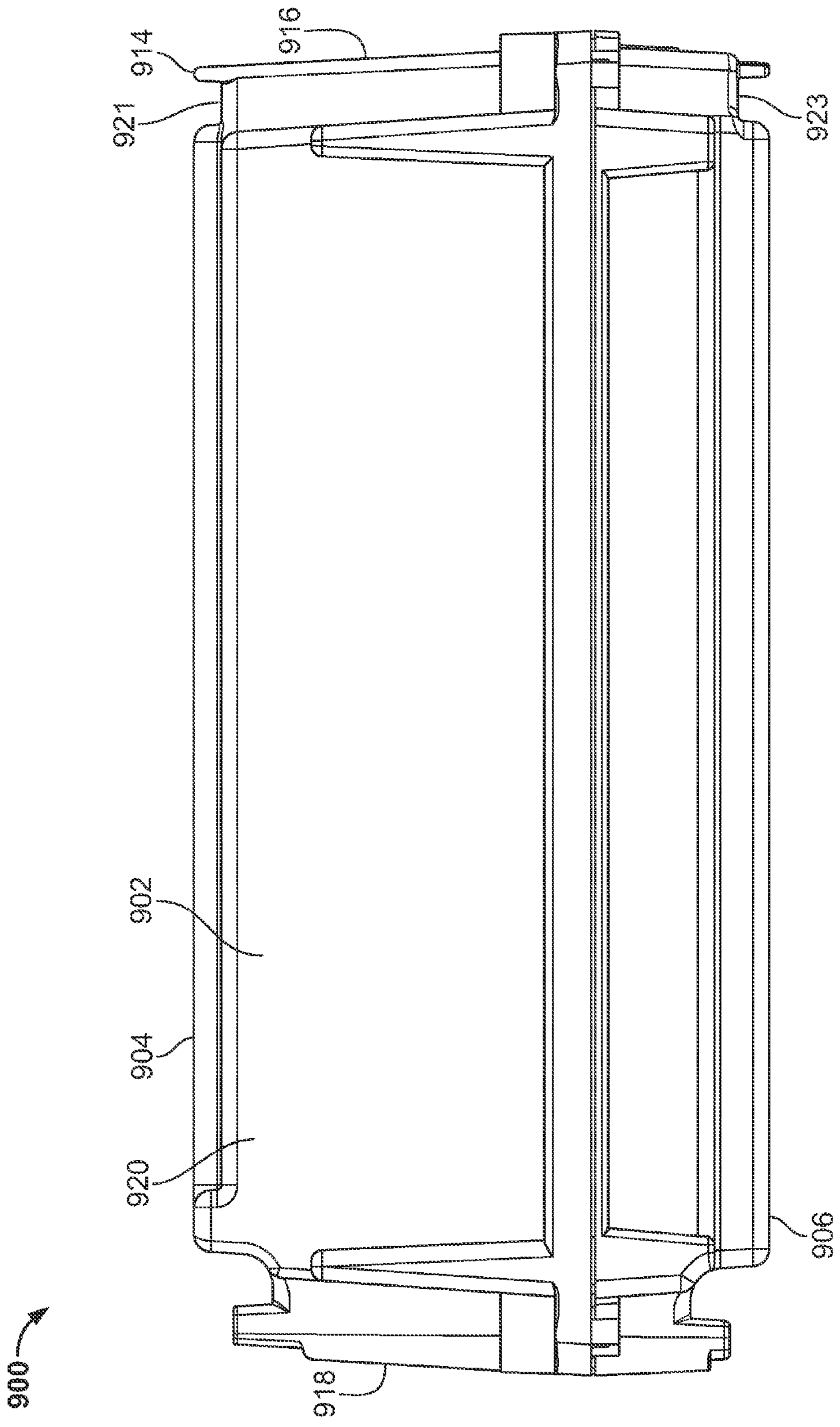
FIG. 12 is a left side view of the dual cartridge shown in FIG. 9A in accordance with aspects of the disclosure.

FIG. 10 is a back view of the dual cartridge shown in FIG. 9A in accordance with aspects of the disclosure. FIG. 11 is a right side view of the dual cartridge shown in FIG. 9A in accordance with aspects of the disclosure. FIG. 12 is a left side view of the dual cartridge shown in FIG. 9A in accordance with aspects of the disclosure. FIG. 13 is a top view of the dual cartridge shown in FIG. 9A in accordance with aspects of the disclosure.

Figure 14:
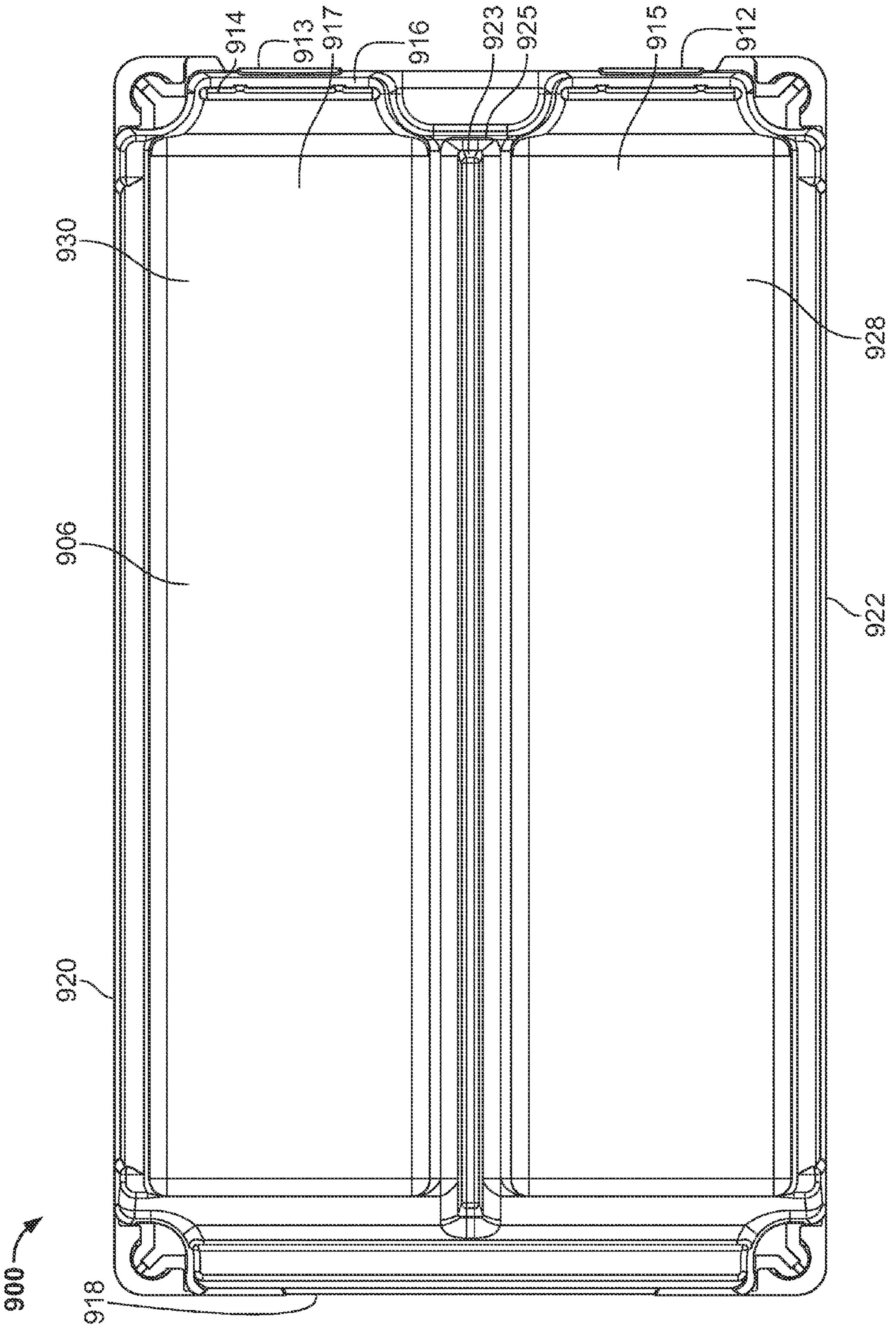
FIG. 14 is a bottom view of the dual cartridge shown in FIG. 9A in accordance with various aspects of the disclosure.
Figure 15:
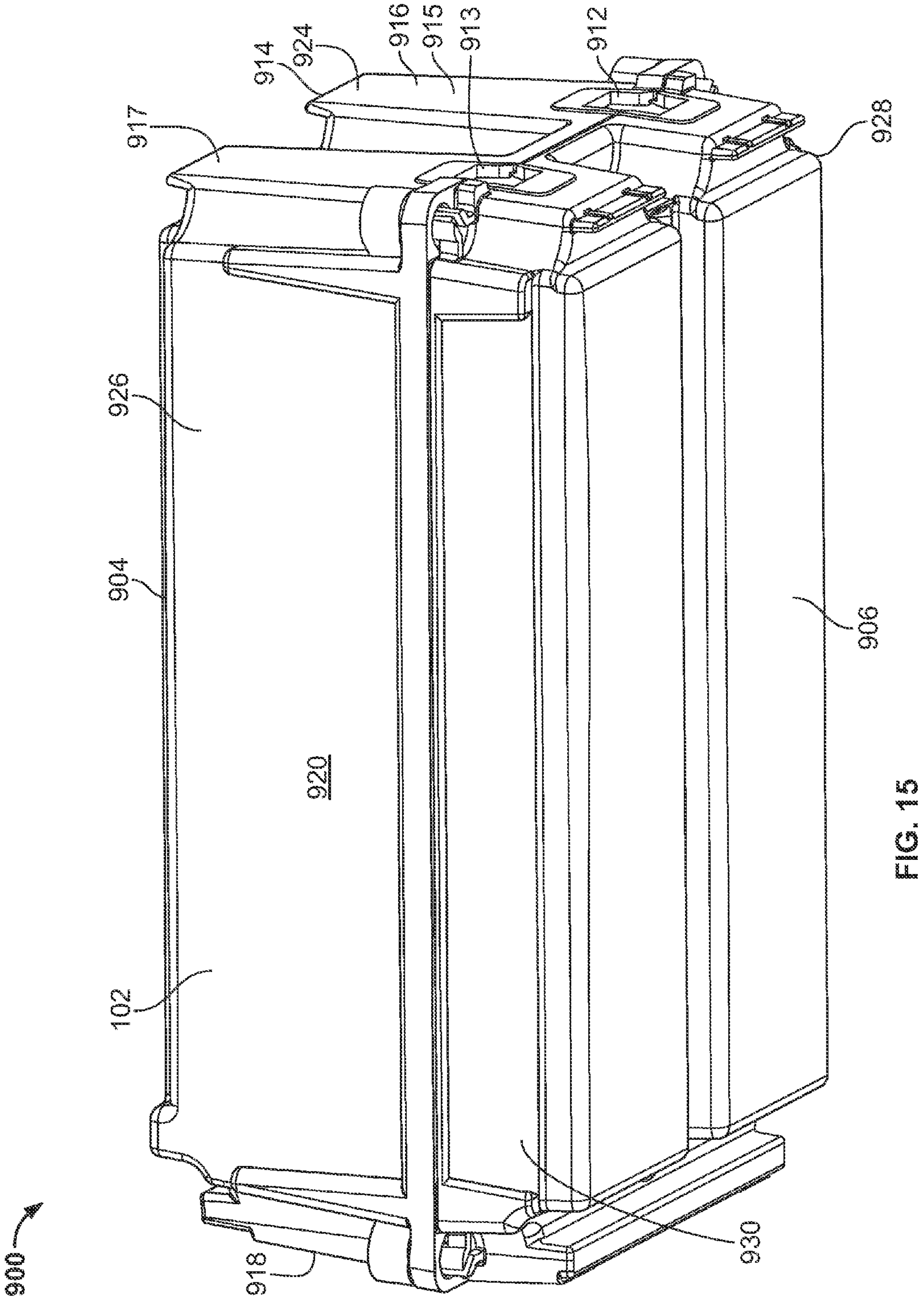
FIG. 15 is a bottom, front, left perspective view of the dual cartridge shown in FIG. 9A in accordance with various aspects of the disclosure.
Figure 16:
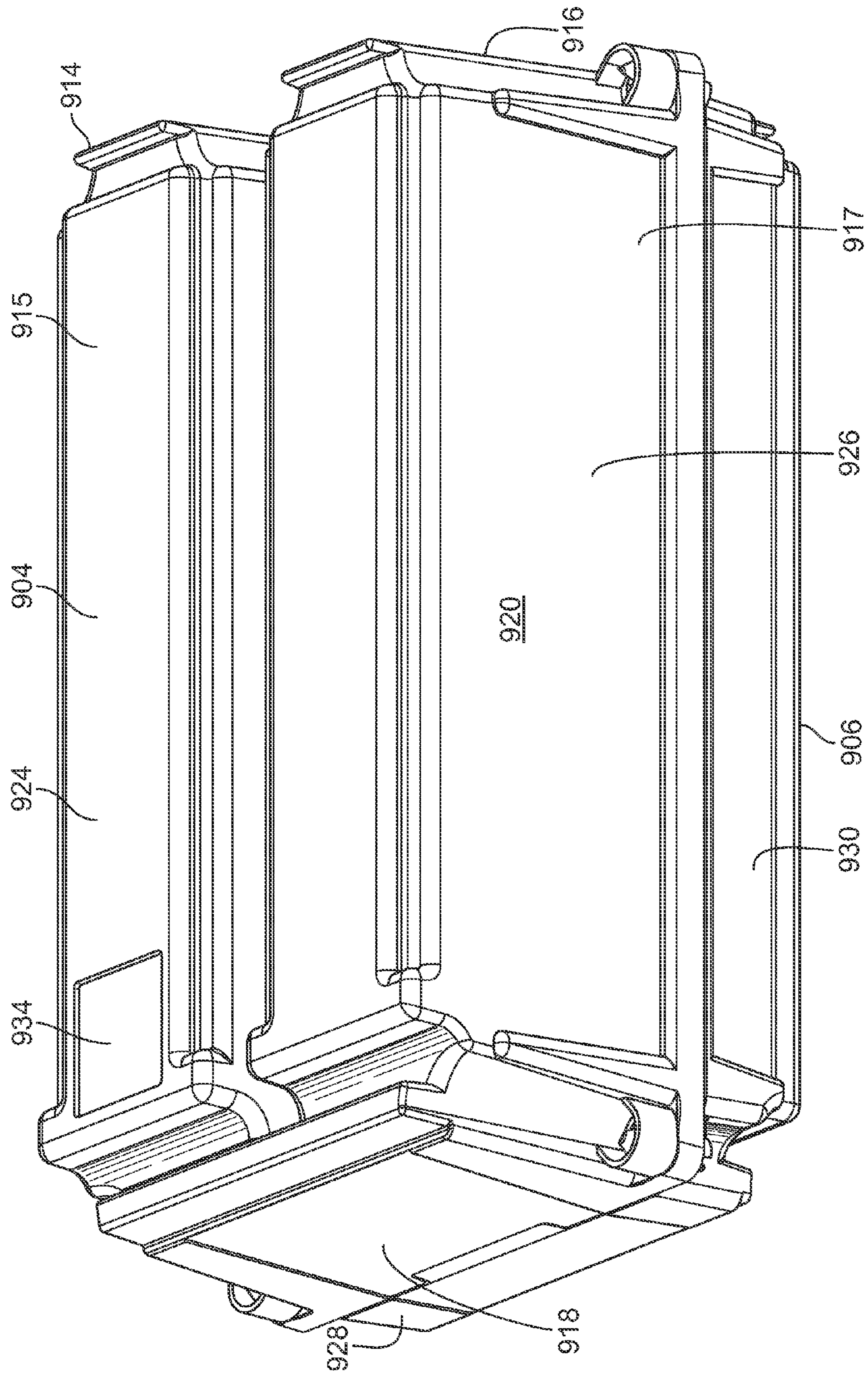
FIG. 16 is a top, rear, right perspective view of the dual cartridge shown in FIG. 9A in accordance with aspects of the disclosure.

FIG. 14 is a bottom view of the dual cartridge shown in FIG. 9A in accordance with various aspects of the disclosure. FIG. 15 is a bottom, front, left perspective view of the dual cartridge shown in FIG. 9A in accordance with various aspects of the disclosure. FIG. 16 is a top, rear, right perspective view of the dual cartridge shown in FIG. 9A in accordance with aspects of the disclosure.

Figure 17:
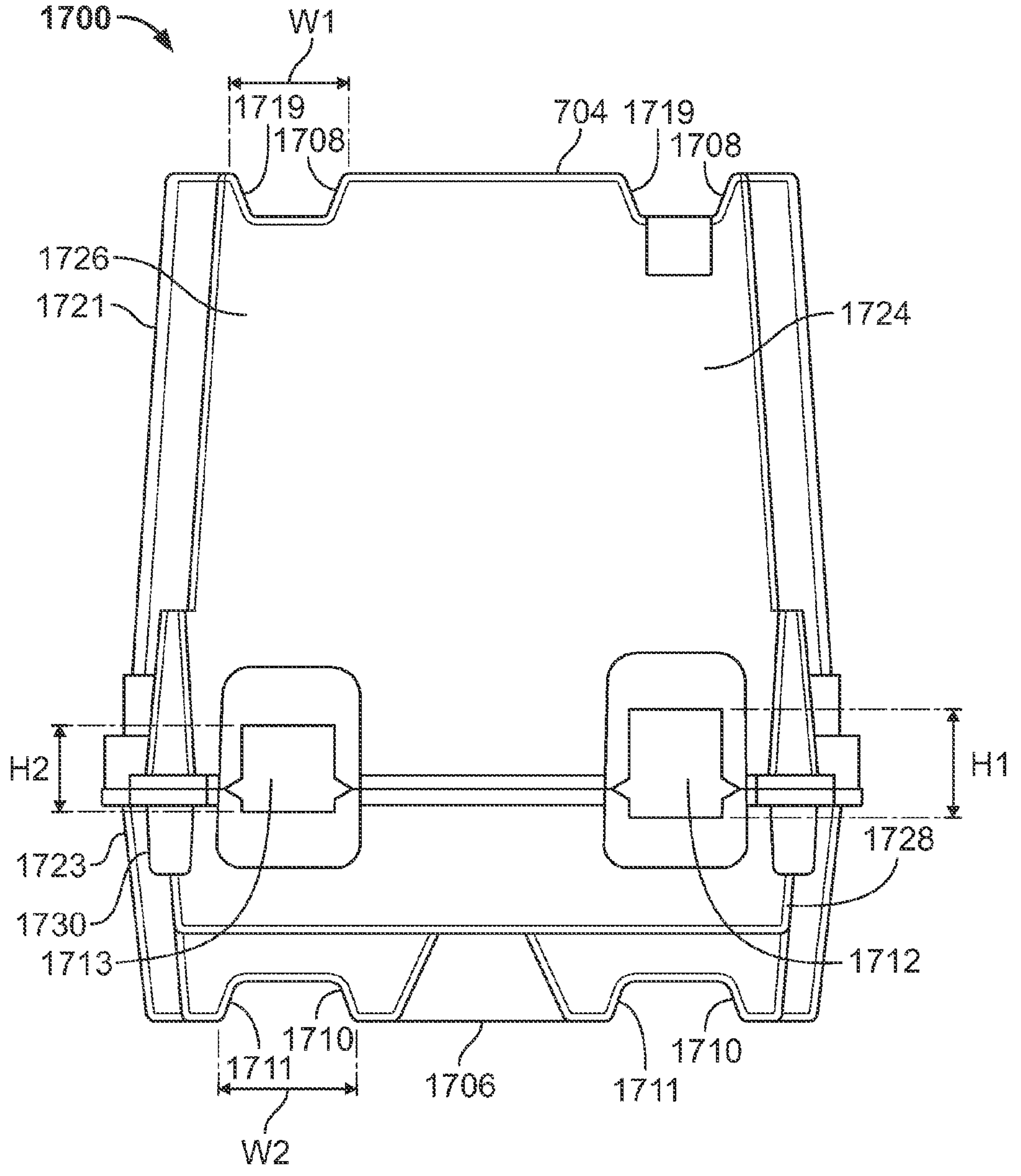
FIG. 17 is a front view of an alternative dual cartridge in accordance with various aspects of the disclosure.

FIG. 17 is a front view of an alternative cartridge 1700 in accordance with various aspects of the disclosure. Cartridge 1700 may have similar aspects as cartridge 900 or cartridge 901 previously discussed with respect to FIG. 9A through FIG. 16. Cartridge 1700 comprises at least one top mating member 1708 at top 1704, and at least one bottom mating member 1710 at bottom 1706. Top mating member 1708 is asymmetric with the at least one bottom mating member 1710. Each mating member is configured to match with a corresponding mating member of a cartridge frame (not shown in FIG. 17). Cartridge 1700 defines two openings 1712 and 1713. Openings 1712 and 1713 may be similar to openings 912 and 913, previously discussed.

Cartridge 1700 may comprise an upper portion 1721. Upper portion 1721 may comprise a right upper portion 1724 and a left upper portion 1726. Upper portion 1721 may be a unitary piece. For example, upper portion 1721 may be a unitary, molded plastic. Cartridge 1700 may comprise a lower portion 1723. Lower portion 1723 may comprise a right lower portion 1728 and a left lower portion 1730. Lower portion 1723 may be a unitary piece. For example, lower portion 1723 may be a unitary, molded plastic.

As shown in FIG. 17, each top mating member 1708 may comprise a top channel 1719. Each top channel 1719 may have a width W1. As shown in FIG. 17, each bottom mating member 1710 may comprise a bottom channel 1711. Each bottom channel 1711 may have a width W2. In an aspect of the disclosure, width W1 is different than width W2. For example, width W1 may be less than width W2, e.g., width W1 may be 9/16 inches, and width W2 may be 11/16 inches. Because each mating member may be configured to match with a corresponding mating member of a cartridge frame (not shown in FIG. 17), and each top mating member is asymmetric with a bottom mating member, the top and bottom mating members, in combination, prevent cartridge 1700 from being inserted into or placed on a frame or rack upside down. In other words, due to the asymmetric relationship between the top and bottom mating members, cartridge 1700 has a fail-safe (or in Japanese, a poka-yoke) loading structure.

In an aspect of the disclosure electronics and/or signals may be brought forward through the channels, and a visual or audio signal may indicate that cartridge 1700 corresponds to correct placement on a frame or rack. In an aspect, cartridge 1700 may comprise a code, e.g., an RFID code. The code may correspond to a component maintained in cartridge 1700. The code may be configured to be read by a code reader of a frame or rack. When cartridge 1700 is placed in relation to the frame and rack at a predetermined correct position, a visual or audio signal (e.g., a "load me" indicator) indicates to a user that cartridge 1700 is in correction position to be moved onto the frame or rack.

Figure 18:
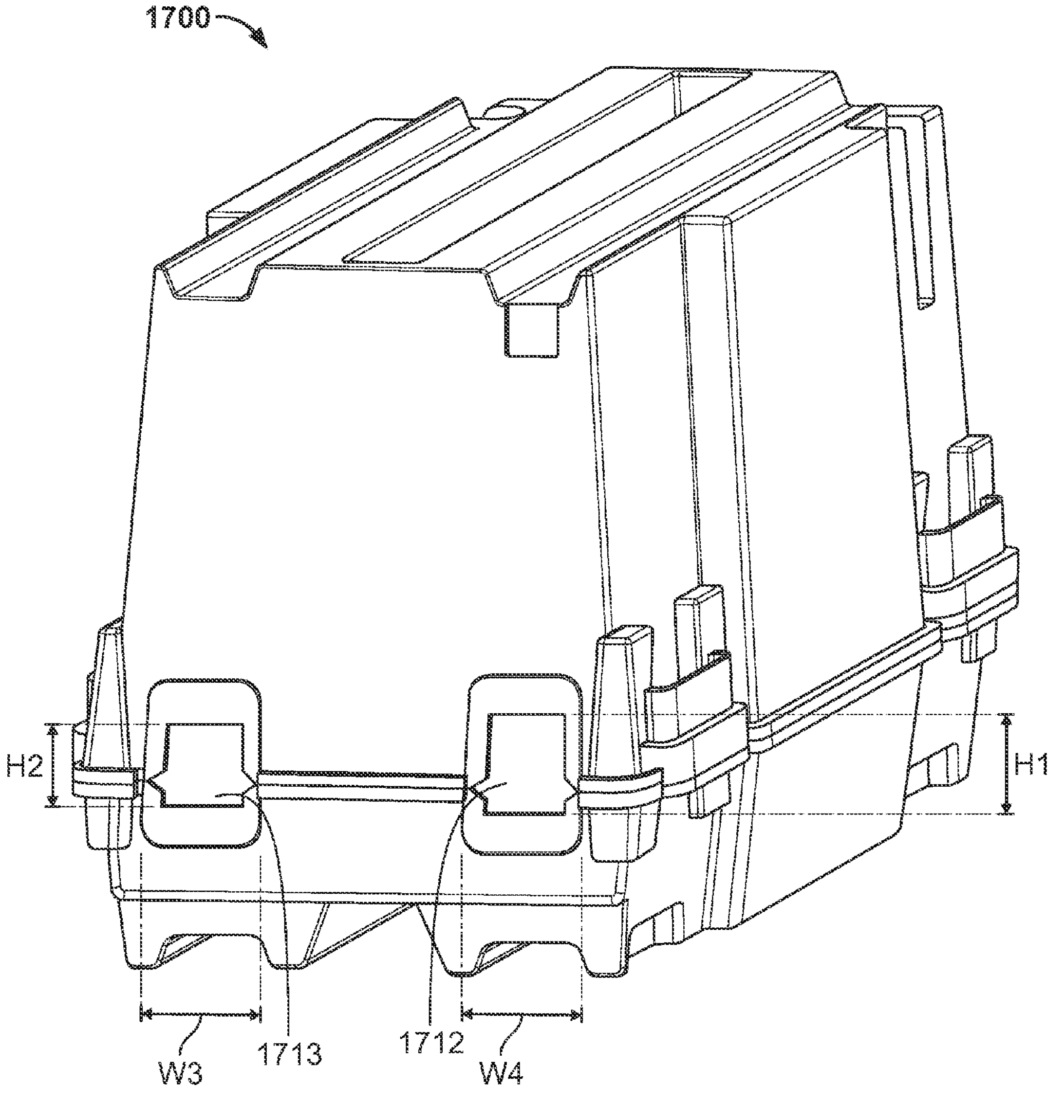
FIG. 18 is a top, front, right perspective view of the dual cartridge in accordance with aspects of the disclosure.

FIG. 18 is a top, front, right perspective view of the cartridge 1700 shown in FIG. 17, in accordance with aspects of the disclosure. Opening 1712 has a width W4, and opening 1713 has a width W3. As shown in FIG. 18, width W4 is the same as W3, e.g., each may be 12 mm. As shown in FIG. 18, opening 1712 has a height H1 and opening 1713 has a height H2. Opening 1712 may be the same as or similar to opening 912 in FIG. 9B. Opening 1713 may be the same as or similar to opening 913 in FIG. 9B. In an aspect of the disclosure, width H1 is different than height H2. For example, height H1 may be greater than height H2, e.g., height H1 may be configured to accommodate a first fitment (e.g., a first fitment of about 14.5 mm in height) corresponding to a first pouch, and height H2 may be configured to accommodate a second fitment (e.g., a second fitment having a height of about 12 mm) corresponding to a second pouch, but not accommodate the first fitment corresponding to the first pouch. Height H1 may correspond to a predetermined first component that is to be allowed to flow from the first pouch and out of opening 1712. Height H2 may correspond to a predetermined second component that is to be allowed to flow from a second pouch and out of opening 1713. In an aspect, a first component may be an acid, and the first pouch may be an acid pouch within cartridge 1700. In an aspect, a second component may be a flavor, and the second pouch may be a flavor pouch within cartridge 1700. In an aspect, the cartridge may be configured so that a pouch comprising the first component, such as an acid, can be only placed in the cartridge so that the first component may be dispensed or evacuated through opening 1712, but not through opening 1713.

Figure 19:
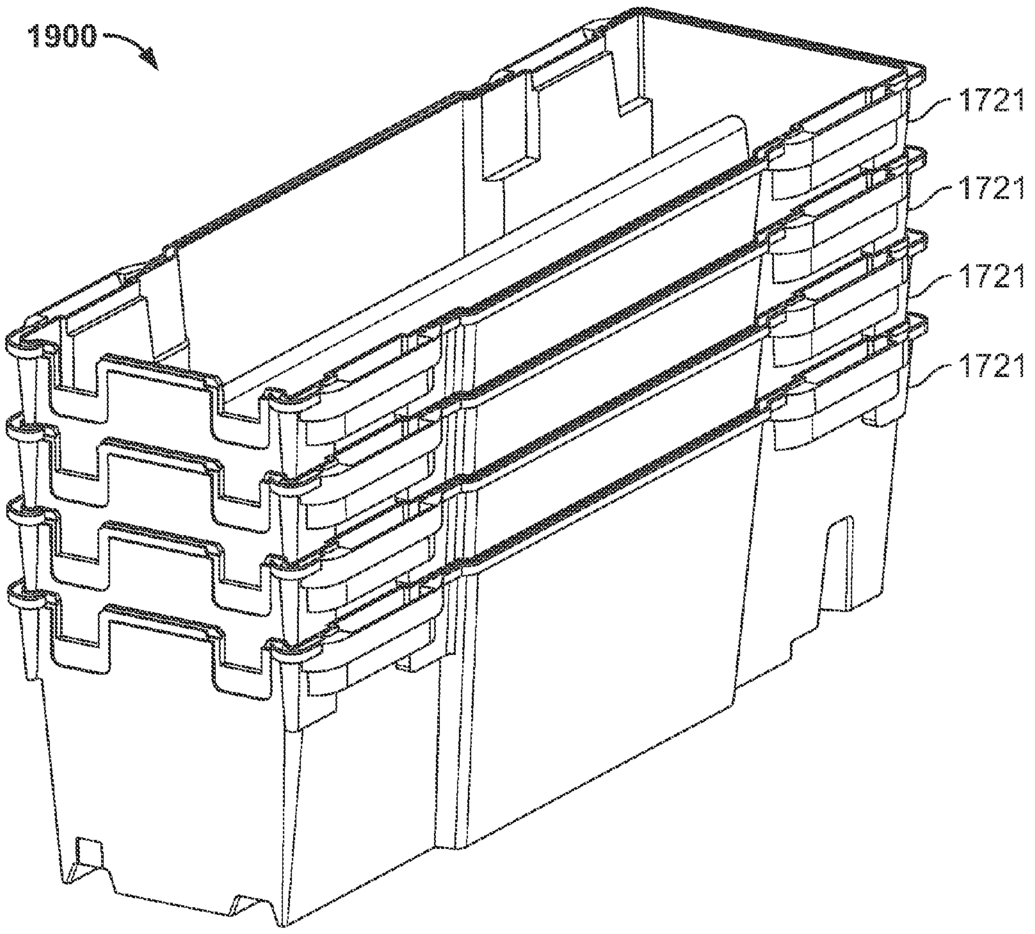
FIG. 19 is a perspective view of a stack of top sections of dual cartridges in accordance with aspects of the disclosure.

FIG. 19 is a perspective view of a stack 1900. Stack 1900 comprises a stack of nested upper portions 1721 in accordance with aspects of the disclosure. Stack 1900 may be about 3-4 feet in height. Stack 1900 is configured to be placed in a sleeve (not shown in FIG. 19). Stack 1900 is configured to be loaded into automatic pick and place equipment. Those skilled in the art will recognize that in accordance with the disclosure stack height may vary.

Figure 20:
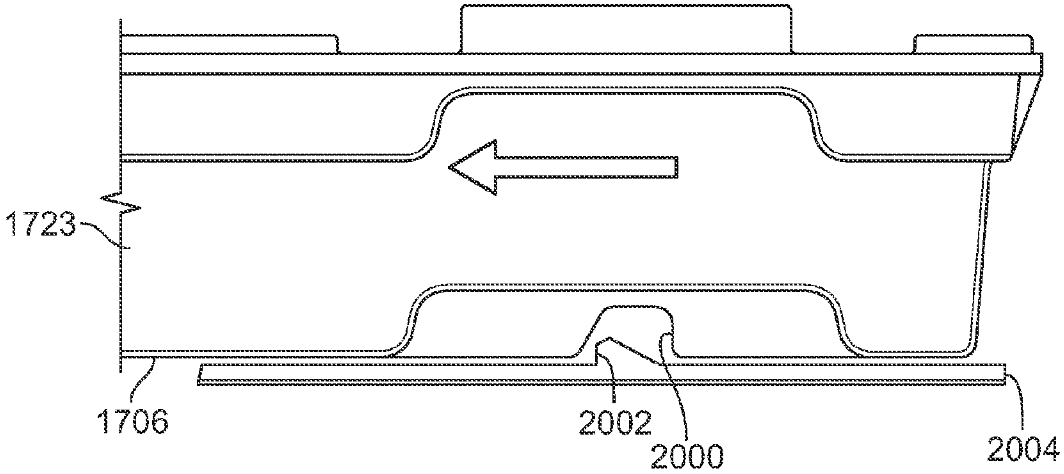
FIG. 20 is a side view of a lower portion of a cartridge in accordance with aspects of the disclosure.

FIG. 20 is a side view of a lower portion 1723 of cartridge 1700 in accordance with aspects of the disclosure. As shown in FIG. 20, lower portion 1723 may comprise a latch notch 2000. Latch notch 2000 may be at bottom 1706 of lower portion 1723. Latch notch 2000 may be configured to latch to a corresponding latch finger 2002 of a shelf 2004. Shelf 2004 may be part of a frame or rack. As shown in FIG. 20, as the lower portion 1723 is slid along shelf 2004 from right to left, bottom 1706 rides over latch finger 2002 of a shelf 2004 until latch notch 2000 latches onto latch finger 2002. Latch notch 2000 in combination with latch finger 2002 reduces or prevents incomplete insertion of lower portion 1723, and thus cartridge 1700, onto shelf 2004 of a frame or rack.

Figure 21:
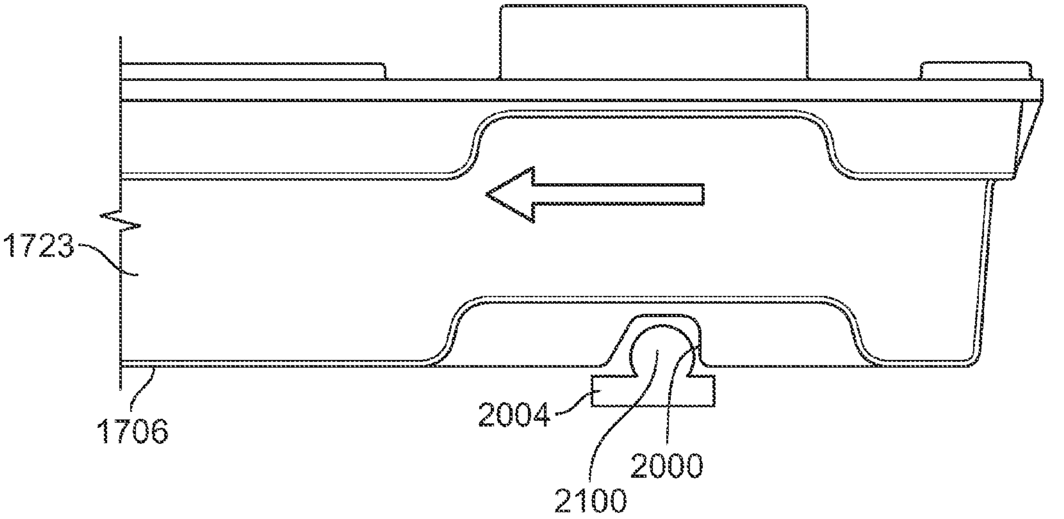
FIG. 21 is a side view of a latching embodiment in accordance with aspects of the disclosure.

FIG. 21 is a side view of a latching embodiment in accordance with aspects of the disclosure. As shown in FIG. 21, latch notch 2000 may be configured to latch to a corresponding solenoid latch bar 2100 of shelf 2004 (only a portion of shelf 2004 is shown in FIG. 21). As shown in FIG. 21, as the lower portion 1723 is slid from right to left along shelf 2004, bottom 1706 rides over solenoid latch bar until latch notch 2000 latches onto solenoid latch bar 2100. Latch notch 2000 in combination with solenoid latch bar 2100 reduces or prevents incomplete insertion of lower portion 1723, and thus cartridge 1700, onto shelf 2004 of a frame or rack. Those of skill in the art will recognize that, in accordance with the disclosure, any suitable latch points for solenoid pins may be provided in lower portion 1723.

Figure 22:
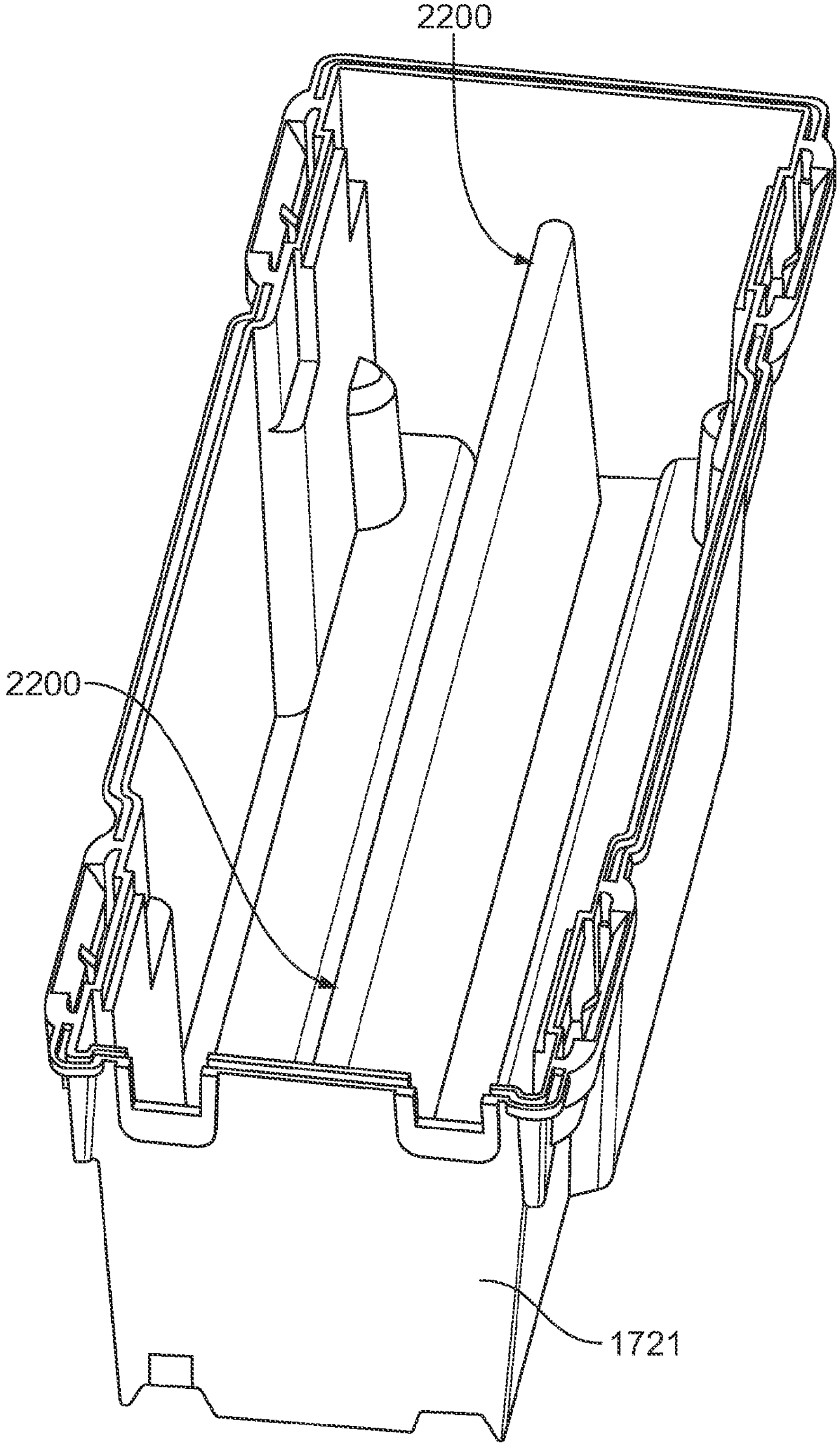
FIG. 22 is a bottom, front, left perspective view of a top portion of a cartridge in accordance with aspects of the disclosure.

FIG. 22 is a bottom, front, left perspective view of an upper portion 1721 in accordance with aspects of the disclosure. As shown in FIG. 22, upper portion 1721 comprises a divider or center guide 2200. Center guide 2200 is configured to guide a pouch into the correct compartment of upper portion 1721. Center guide 2200 is configured to prevent pouches from interfering with each other. Center guide 2200 is configured to provide rigid support for pouches. If pouches are allowed to come into contact with each other, e.g., during shipping and handling, the pouches may abrade.

Figure 23:
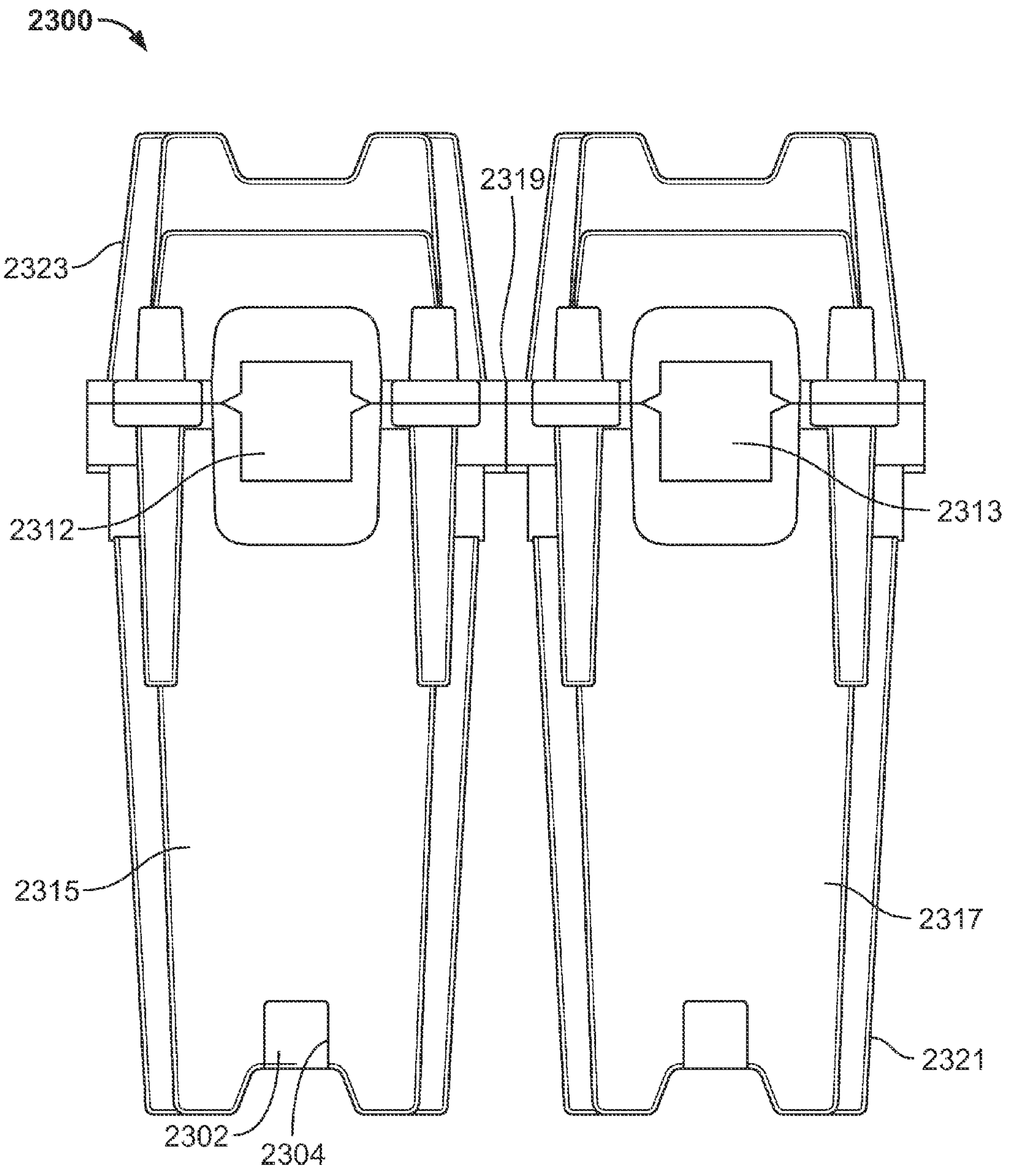
FIG. 23 is a front view of a cartridge in accordance with aspects of the disclosure.

FIG. 23 is a front view of a cartridge 2300 in a production orientation in accordance with aspects of the disclosure. In the production orientation, the upper portion of the cartridge is placed upside down so that pouches can be placed within the upper portion, and the lower portion of the cartridge can be placed on top of the upper portion, and fasteners can then be used to fasten the lower portion to the upper portion. When the cartridge is to be later inserted or placed on a frame or rack, the cartridge is turned right side up so that the upper portion is above the lower portion of the cartridge.

Cartridge 2300 has similar aspects as cartridge 900, cartridge 901 and cartridge 1700, previously discussed. Cartridge 2300 has a first compartment 2315 and a second compartment 2317. First and second compartments 2315 and 2317 may correspond respectively to compartments 915 and 917 of cartridge 901 as shown in FIG. 9B. Compartments 2315 and 2317 may be joined together by connection member 2319. Connection member 2319 of cartridge 2300 may correspond to connection member 919 of cartridge 900 or cartridge 901. Upper portion 2321 and lower portion 2323 may be joined together and define openings 2312 and 2313. Openings 2312 and 2313 of cartridge 2300 may be similar to openings 1712 and 1713 of cartridge 1700. As previously discussed with respect to cartridge 900, cartridge 901 and cartridge 1700, the upper and lower portions, in combination, define openings, i.e., openings 912 and 913 for cartridge 900 or cartridge 901, and openings 1712 and 1713 for cartridge 1700. Openings 912, 913, 1712, 1713, 2312, and 2313 are fitment openings or slots. Each opening may be configured to allow a fitment to slide easily through the opening. For example, each opening may be tapered. By way of further example, each opening may be tapered 2 mm to 3.5 mm to provide an opening or slot for fitment insertion. Cartridge 2300 may comprise an identification tag 2302. Identification tag 2302 may be configured to fit into a groove 2304 of cartridge 2300.

Figure 24:
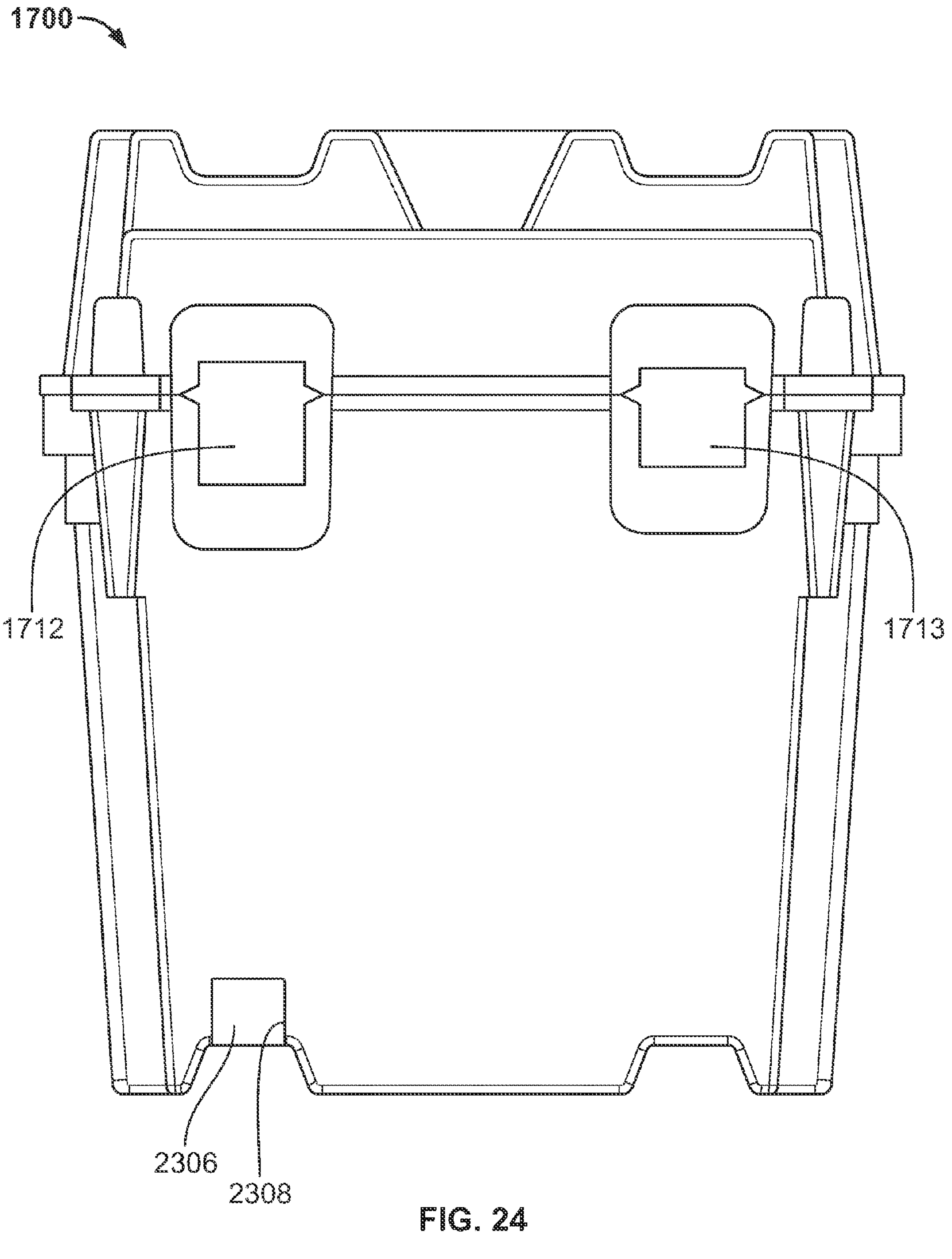
FIG. 24 is a front view of a cartridge in accordance with aspects of the disclosure.

FIG. 24 is a front view of a cartridge 1700 in a production orientation in accordance with aspects of the disclosure. In the production orientation, the upper portion of the cartridge is placed upside down so that pouches can be placed within the upper portion, and the lower portion of the cartridge can be placed on top of the upper portion, and fasteners can then be used to fasten the lower portion to the upper portion. When the cartridge is to be later inserted or placed on a frame or rack, the cartridge is turned right side up so that the upper portion is above the lower portion of the cartridge. As previously discussed, the upper and lower portions, in combination, define openings, i.e., openings 1712 and 1713 for cartridge 1700. These openings are fitment slots. Each opening may be configured to allow a fitment to slide easily through the opening. For example, each opening may be tapered. By way of further example, each opening may be tapered 2 mm to 3.5 mm to provide an opening or slot for fitment insertion. As shown in FIG. 24, cartridge 1700 may comprise an identification tag 2306. Identification tag 2306 may be configured to fit into a groove 2308 of cartridge 1700.

Figure 25:
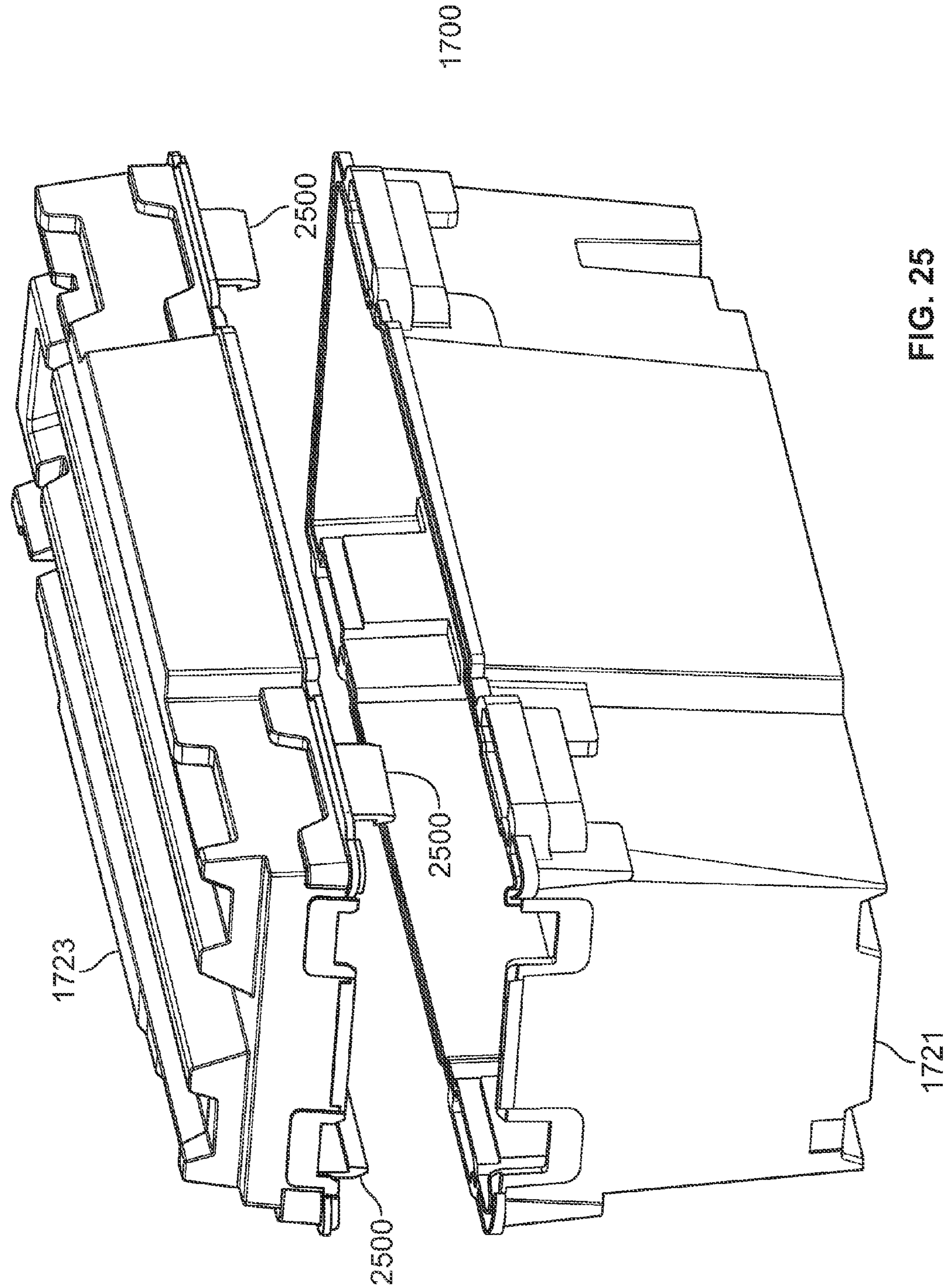
FIG. 25 is an exploded perspective view of a cartridge in accordance with aspects of the disclosure.

FIG. 25 is an exploded perspective view of cartridge 1700 in an upside down orientation in accordance with aspects of the disclosure. As previously discussed, upper portion 1721 and a lower portion 1723 cartridge 1700 may be joined together. Using fastener latches 2500, and/or belt loops (not shown in FIG. 25) the assembled cartridge 1700 is highly tamper resistant. Cartridge 1700 may comprise guide grooves to further facilitate ease and accuracy of assembly, i.e., joining upper portion 1721 and lower portion 1723.

Figures 26, 27:
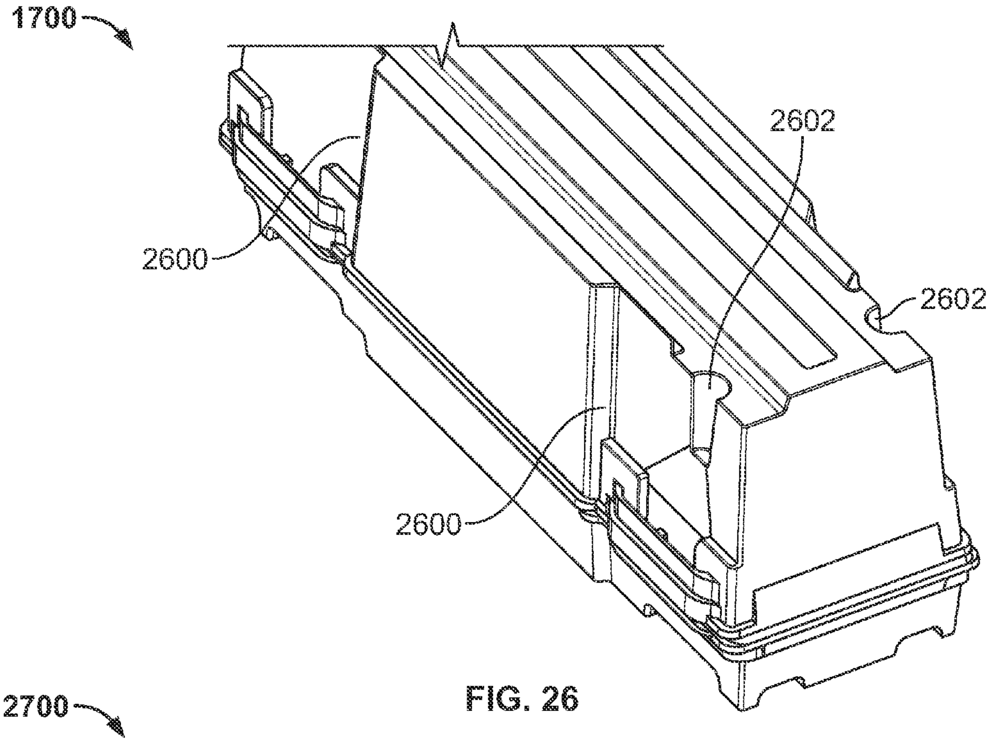
FIG. 26 is a perspective view of a cartridge in accordance with aspects of the disclosure.
FIG. 27 is a flow diagram of a method in accordance with aspects of the disclosure.

FIG. 26 is a perspective view of cartridge 1700 in accordance with aspects of the disclosure. As shown in FIG. 26, cartridge 1700 may comprise notches 2600. Notches 2600 may be configured to allow for stacking of upper portions 1721 and/or lower portions 1723 around latches. Cartridge 1700 may comprise finger grips 2602 to facilitate movement of cartridge 1700, e.g., removal of cartridge 1700 from a shelf of frame or rack. For example, a user can remove cartridge 1700 by using a thumb and forefinger to grab finger grips 2602. Tapered sides of cartridge 1700 may facilitate or assist in the depth of "grab" of finger grips 2602.

FIG. 27 is a flow diagram of a method 2700 in accordance with aspects of the disclosure. Step 2702 of method 2700 comprises placing a top portion of the cartridge upside down so that a top face of the top portion faces downward and the top portion is oriented to receive a pouch. Step 2704 of method 2700 comprises placing a pouch into the top portion of the cartridge. Step 2706 of method 2700 comprises orienting a lower portion of the cartridge upside down so that a bottom face of the lower portion faces upward. Step 2708 of method 2700 comprises placing the lower portion of the cartridge on top of the upper portion. Step 2710 of method 2700 comprises fastening the lower portion and the upper portion. In accordance with method 2700, at least one top mating member at a top of the upper portion is asymmetric to at least one bottom mating member at a bottom of the lower portion, and each mating member is configured to match with a corresponding mating member of a cartridge frame. Method 2700 may further comprise mating the at least one top mating member at a top of the upper portion with a corresponding mating member of the cartridge frame, and mating the at least one bottom mating member at the bottom of the lower portion with a corresponding mating member of the cartridge frame.

Figure 28:
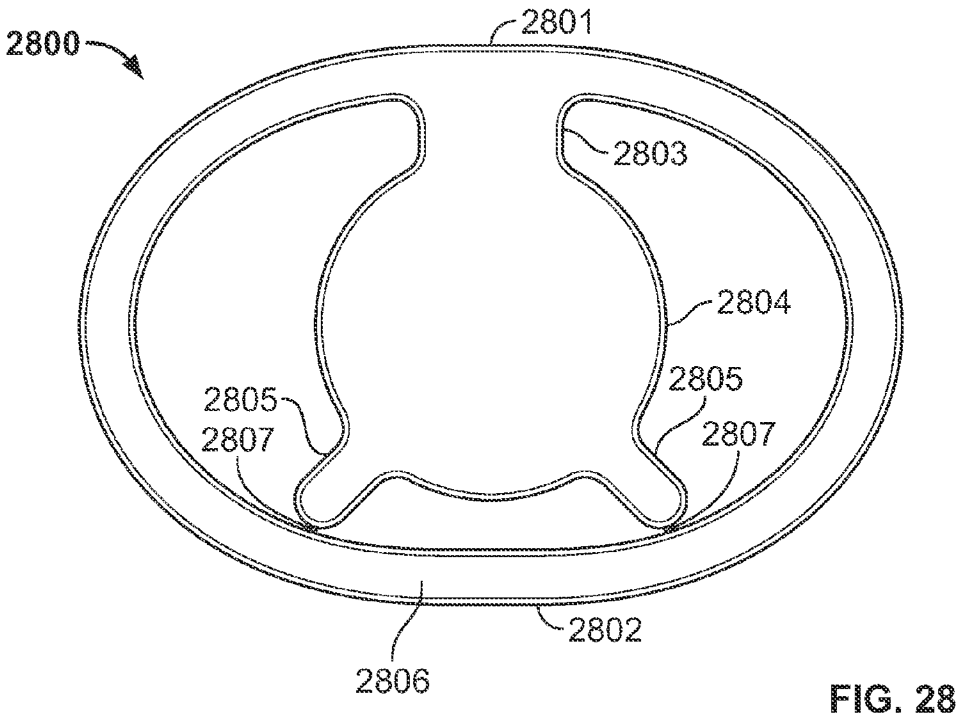
FIG. 28 is a top view of a dust cap in accordance with aspects of the disclosure.
Figure 29:
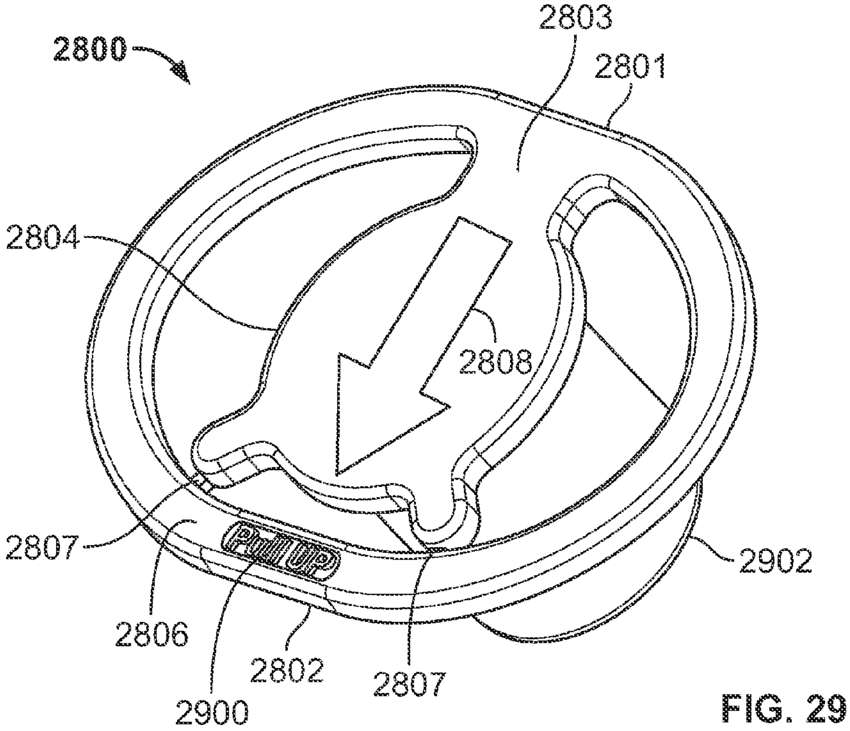
FIG. 29 is a top perspective view of a dust cap in accordance with aspects of the disclosure.

As previously discussed, in an aspect of the disclosure, the cartridge may be configured to provide a membrane over a fitment to keep the fitment clean, e.g., free of dust. FIG. 28 is a top view of membrane 2800 in accordance with aspects of the disclosure. Membrane 2800 may comprise first side 2801 and second side 2802 to facilitate orientation. First side 2801 and second side 2802 may each comprise a flat portion. Membrane 2800 may comprise a dust cap 2804. Membrane 2800 may comprise a plug 2902 as shown in FIG. 29. Plug 2902 may be configured to plug a corresponding fitment. In an aspect of the disclosure, the membrane 2800 may be configured to have a pull tab 2806 with dust cap 2804 attached thereto. Dust cap 2804 may be located between first 2801 and second side 2802. Pull tab 2806 may be located at second side 2802. Membrane 2800 may comprise a section 2803 that connects first side 2801 to dust cap 2804. Membrane 2800 may comprise one or more fingers 2805 extending from dust cap 2804 and towards second side 2802. Each finger 2805 may comprise a break-away bridge or protrusion 2807 that connects the finger 2805 to second side 2802. In an aspect, second side 2802 may be configured to be pulled away from fingers 2805 so that break-away protrusions 2807 no longer connect second side 2802 to fingers 2805. In an aspect, membrane 2800 may be configured so that when the second side 2802 is pulled away from a cartridge, first side 2801 is also pulled away from the cartridge, thereby pulling section 2803 and dust cap 2804 and plug 2902 away from the cartridge. It will be recognized by those of skill in the art that if a cartridge is provided to a user wherein the second side 2802 is not connected to fingers 2805 via protrusions 2807, then there may have been a tampering of the dust cap and/or the contents within the cartridge. In an aspect of the disclosure, dust cap 2804 may be removed prior to inserting the cartridge into a dispensing machine or cartridge frame or rack. In an aspect, the membrane may have a fail-safe of mistake-proofing configuration to prevent cartridge insertion into a cartridge frame unless the dust cap is removed.

FIG. 29 is a top perspective view of membrane 2800 in accordance with aspects of the disclosure. As shown in FIG. 29, a label 2900 may be placed on second side 2802 and over tab 2806 near break-away protrusions 2807. Label 2900 may comprise instructions to a user to remove dust cap 2800, e.g., "Pull Up." Label 2900 may be embossed on tab 2806. Dust cap 2800 may comprise a designation 2808, e.g., an arrow that points towards label 2900. Designation 2808 may be embossed on dust cap 2800.

Figure 30:
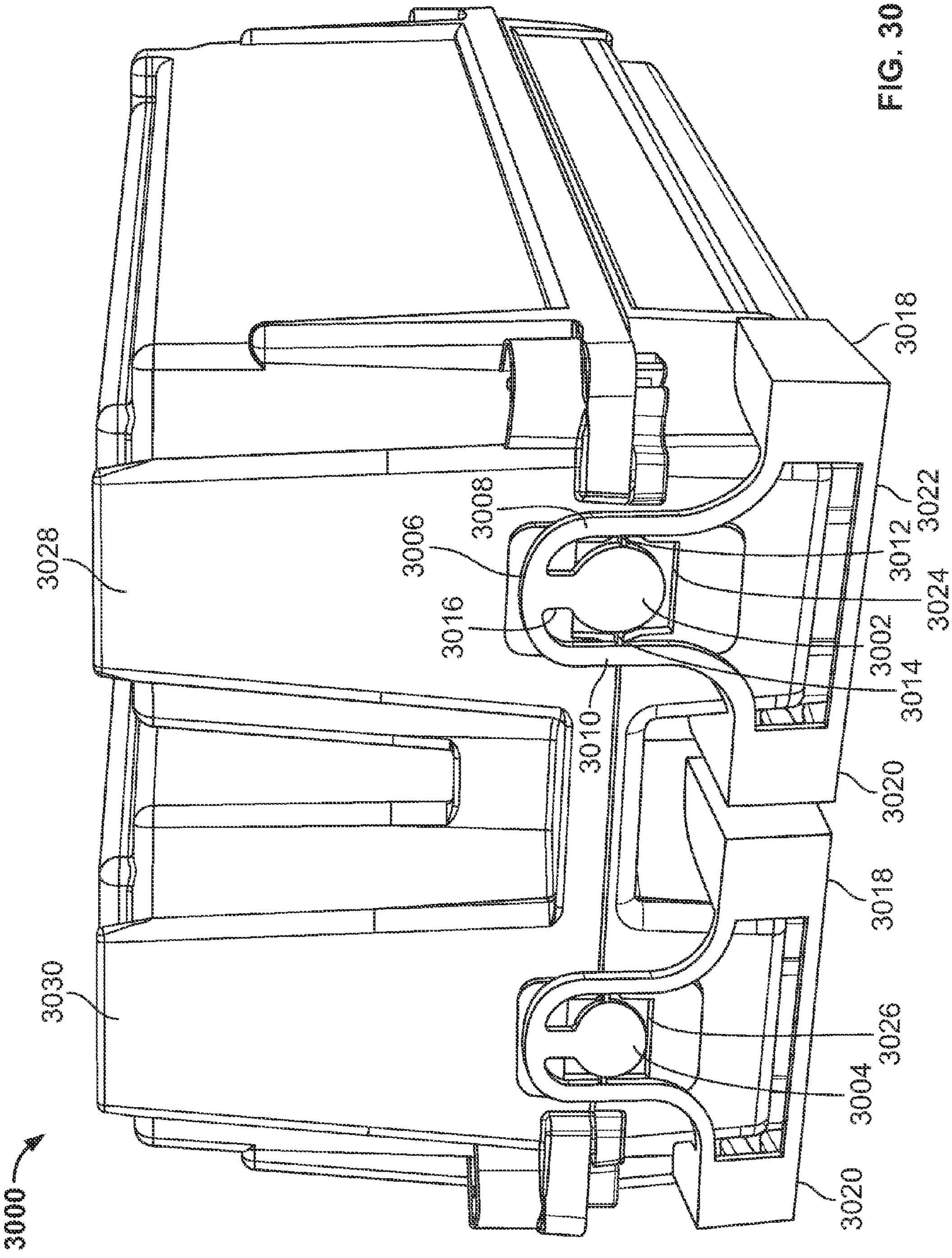
FIG. 30 is a perspective view of a cartridge in accordance with aspects of the disclosure.
Figure 40:
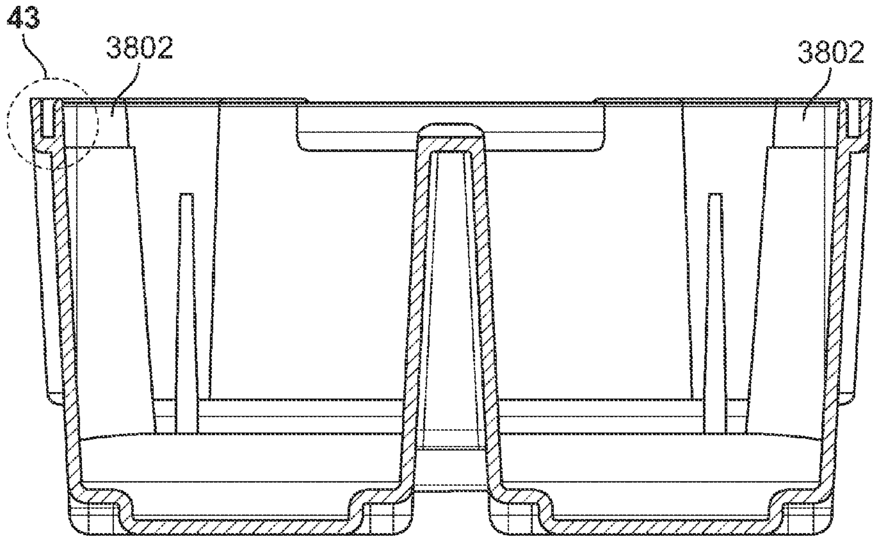
FIG. 40 is an end view of an upper portion taken along line 40-40 in FIG. 38 in accordance with aspects of the disclosure.

FIG. 30 is illustrates a perspective view of a cartridge in accordance with aspects of the disclosure. Cartridge 3000 may be similar to cartridge 900, cartridge 901, cartridge 1700, and cartridge 2300, previously described. As shown in FIG. 30, cartridge 3000 comprises a first dust cap 3002, and a second dust cap 3004. First dust cap 3002 comprises a first side 3006, a second side 3008, and a third side 3010. First dust cap 3002 comprises fingers 3012 and 3014. Finger 3012 and finger 3014 may each comprise a bridge or break-away protrusion that may be similar to break-away protrusion 2807 previously described. First dust cap 3002 comprises section 3016. Section 3016 may be similar to section 2803 previously described. As shown in FIG. 40, first side 3006 is connected to second side 3008, and first side 3006 is also connected to third side 3010. Second side 3008 is connected to first block 3018. Third side 3010 is connected to second block 3020. First block 3018 is connected to second block 3020 via bar 3022. Bar 3022 may be configured to function similar to pull tab 2806, previously described. Bar 3022 may be pulled away from cartridge 3000 thereby pulling blocks 3018 and 3020 away from cartridge 3000. As the blocks are sufficiently pulled away from cartridge 3000, second side 3008 and third side 3010 are pulled away from cartridge 3000, and the connection between finger 3012 and second side 3008 is broken, and the connection between finger 3014 and third side 3010 is broken. As the blocks are further pulled away from cartridge 3000, first side 3006 is pulled away, which pulls away section 3016, which pulls dust cap 3002 away from opening 3024 of cartridge 3000. Opening 3024 may be similar to opening 912, 1712, and 2312 previously described. Dust cap 3004 is similar to dust cap 3002, and comprises the same or similar elements. Dust cap 3002 may be pulled away from opening 3026 of cartridge 3000. Opening 3026 may be similar to opening 913, 1713, and 2313 previously described. Blocks 3018 and 3020 are configured to block insertion of cartridge 3000 into or on a rack or frame unless dust cap 3002 is removed from opening 3024. Similarly, blocks 3018 and 3020 of dust cap 3004 are configured to block insertion of cartridge 3000 into or on a rack or frame unless dust cap 3004 is removed from opening 3026. Dust cap 3002 may be configured to cover a fitment corresponding to a pouch placed in compartment 3028. Dust cap 3004 may be configured to cover a fitment corresponding to a pouch placed in compartment 3030. The fitment corresponding to the pouch placed in compartment 3030 may have different dimensions than the fitment corresponding to the pouch placed in compartment 3030. Thus, dust cap 3002 may have different dimensions than dust cap 3004.

Figure 31:
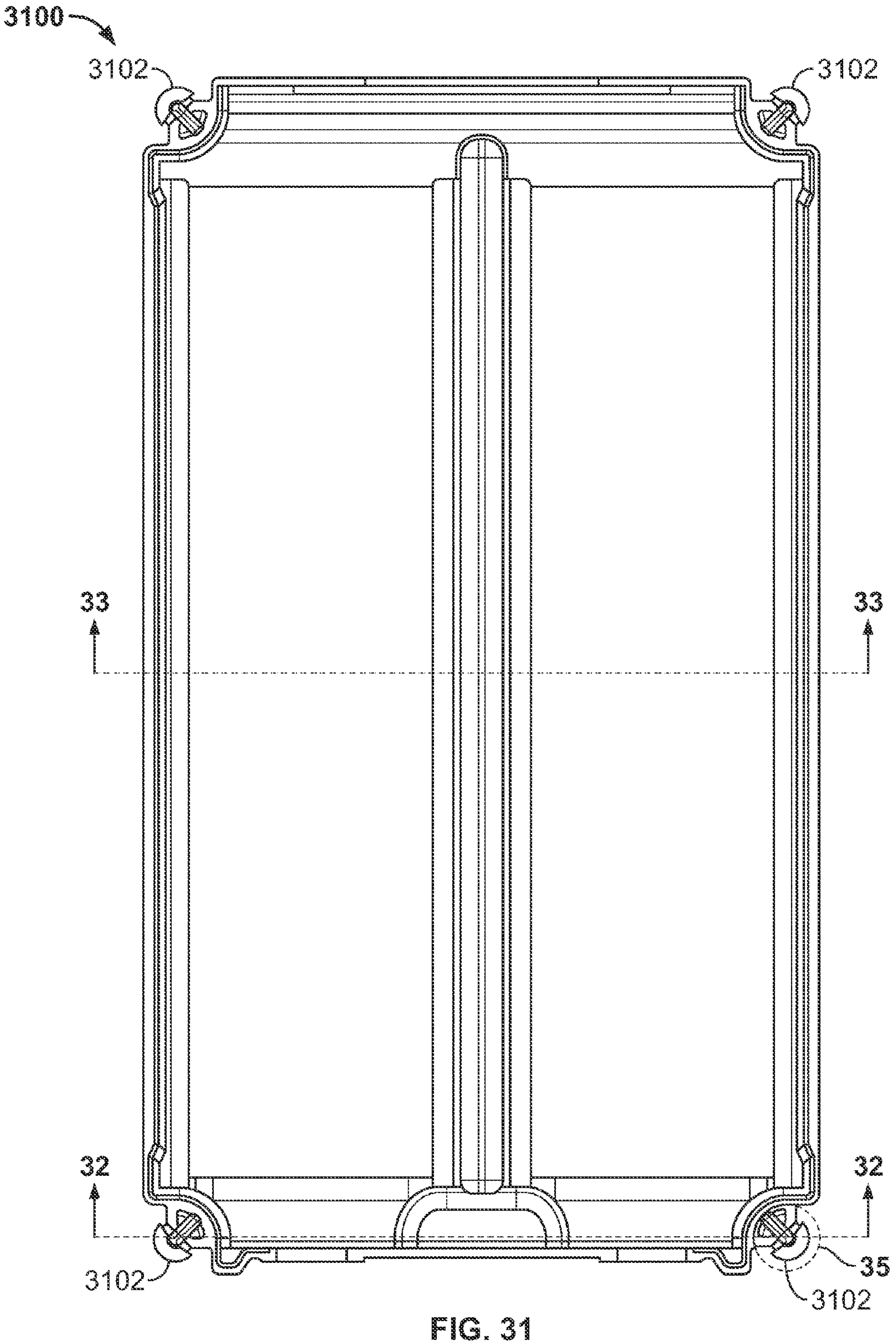
FIG. 31 is a top view of a lower portion of a cartridge in accordance with aspects of the disclosure.
Figure 32:
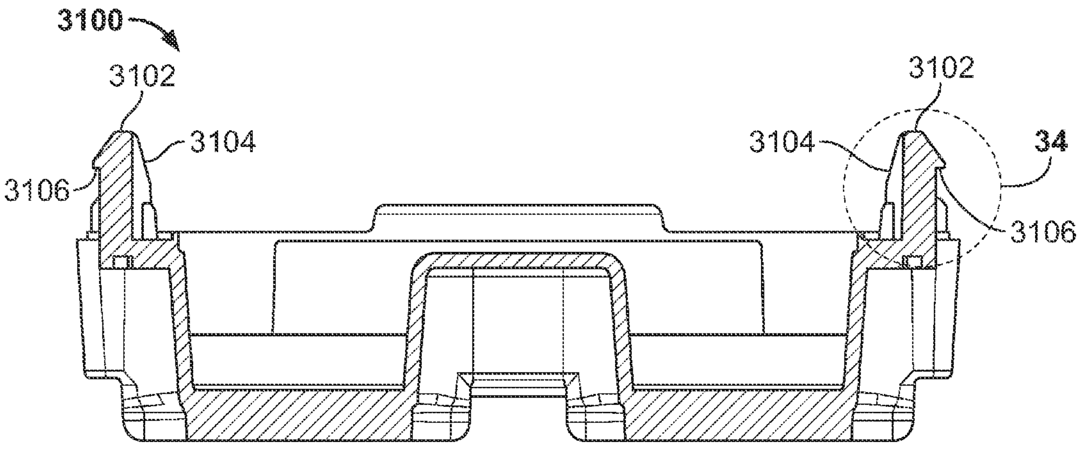
FIG. 32 is an end view of a lower portion taken along line 32-32 in FIG. 31 in accordance with aspects of the disclosure.
Figure 33:
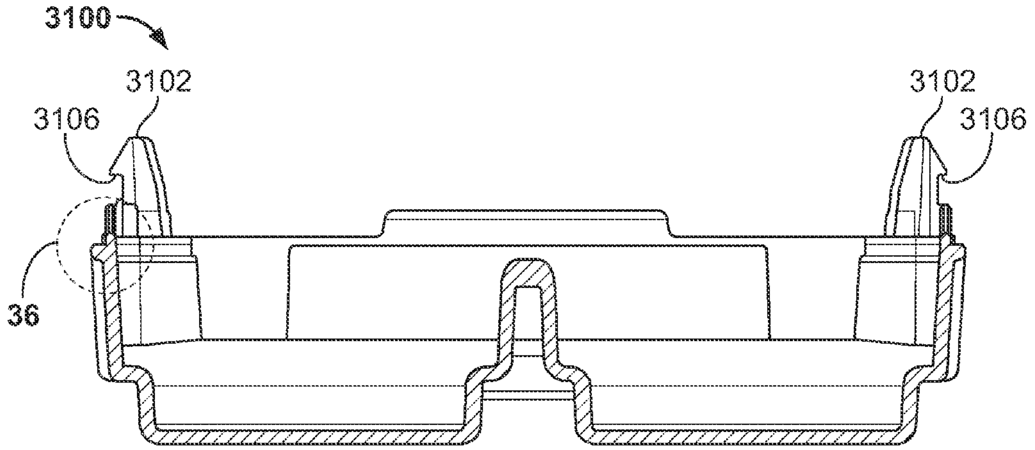
FIG. 33 is an end view of a lower portion taken along line 33-33 in FIG. 31 in accordance with aspects of the disclosure.

FIG. 31 is a top view of a lower portion 3100 of a cartridge in accordance with aspects of the disclosure. FIG. 32 is an end view of lower portion 3100 taken along line 32-32 in FIG. 31. FIG. 33 is an end view of lower portion 3100 taken along line 33-33 in FIG. 31. Lower portion 3100 may be similar to lower portion 1723 in FIG. 17, and lower portion 2323 in FIG. 23. Lower portion 3100 comprises four chamfered alignment posts 3102, with a post 3102 in each corner of lower portion 3100. Each post 3102 is configured to provide for pre-alignment of lower portion 3100 with a corresponding upper portion. More specifically, each post 3102 is configured to mate with a corresponding female member of a corresponding upper portion. Back support 3104 supports post 3102. Each post 3102 comprises a lip 3106 that is configured to mate with a lip of a corresponding surface of a corresponding upper portion.

Figure 34:
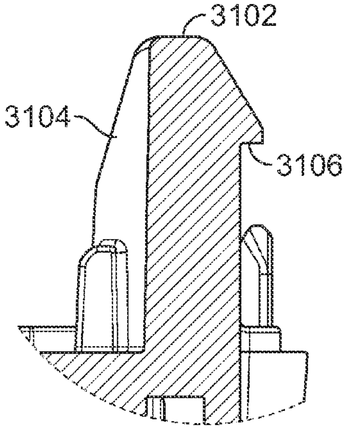
FIG. 34 is an enlarged view of the section of FIG. 32 identified as circle "34" in accordance with aspects of the disclosure.
Figure 35:
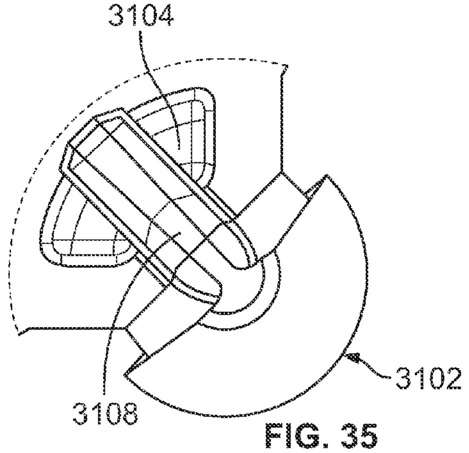
FIG. 35 is a top view of a post shown in FIG. 34 in accordance with aspects of the disclosure.
Figure 36:
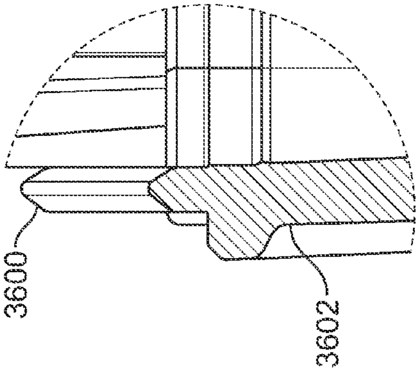
FIG. 36 is an enlarged view of the section of FIG. 33 identified as circle "36" in accordance with aspects of the disclosure.
Figure 37:
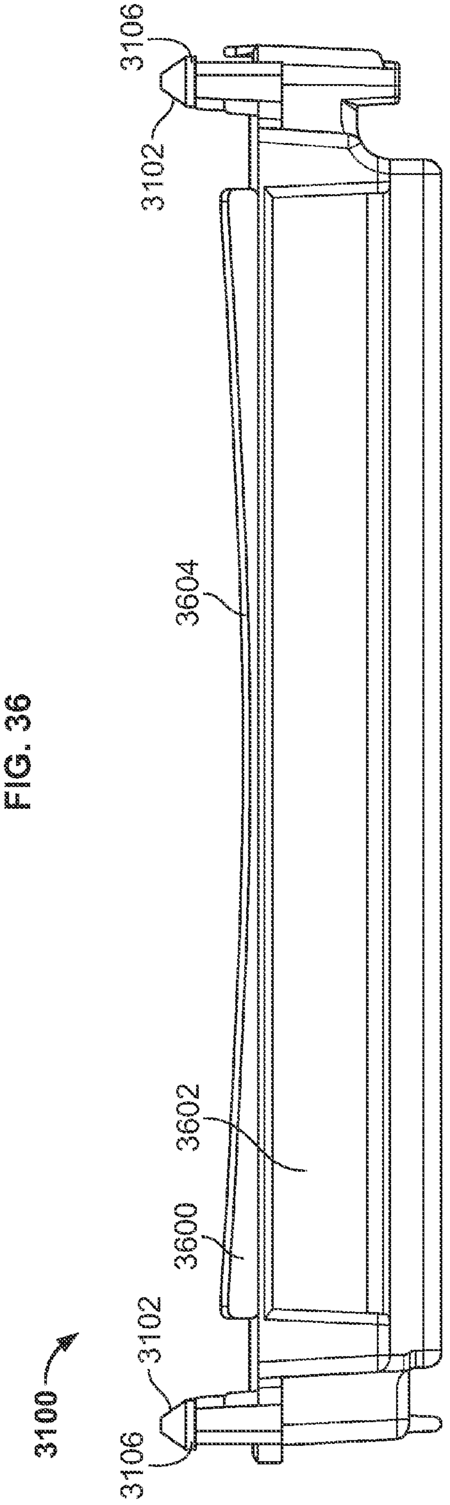
FIG. 37 is a side view of the portion of a cartridge shown in FIG. 31 in accordance with aspects of the disclosure.

FIG. 34 is an enlarged view of the section of FIG. 32 identified as circle "34." FIG. 35 is a top view of post 3102 shown in FIG. 34. As shown in FIG. 35, a support rib 3108 connects post 3102 to back support 3104. FIG. 36 is an enlarged view of the section of FIG. 33 identified as circle "36." FIG. 37 is a side view of the portion of a cartridge shown in FIG. 31. As shown in FIG. 36 and FIG. 37, ridge 3600 is provided along a side 3602 of the lower portion 3100 of a cartridge. A similar ridge 3600 (not shown in FIG. 36 or FIG. 37) is provided along the side of lower portion 3100 that is opposite side 3602. Ridge 3600 has a curved arc 3604. Arc 3604 is configured to mate with a groove of a corresponding upper portion. Ridge 3600 is tapered as shown in FIG. 36.

Figure 38:
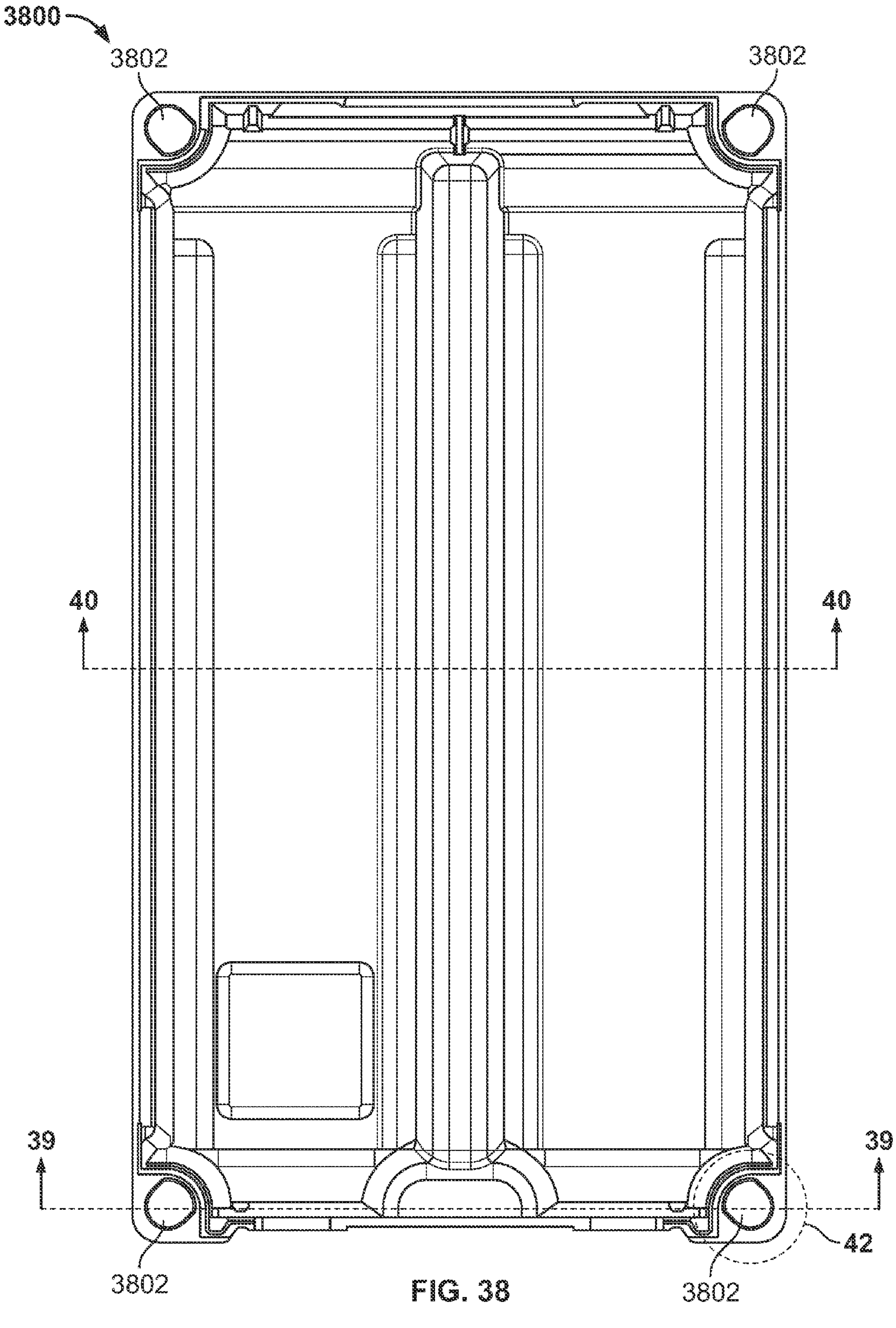
FIG. 38 is a bottom view of an upper portion of a cartridge in accordance with aspects of the disclosure.
Figure 39:
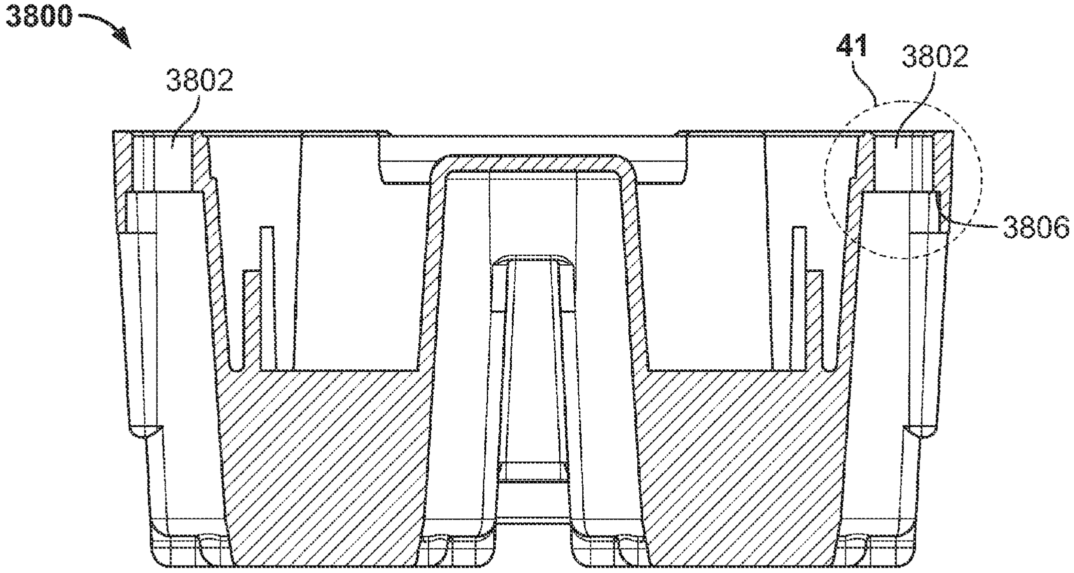
FIG. 39 is an end view of an upper portion taken along line 39-39 in FIG. 38 in accordance with aspects of the disclosure.

FIG. 38 is a bottom view of an upper portion 3800 of a cartridge in accordance with aspects of the disclosure. FIG. 39 is an end view of upper portion 3800 taken along line 39-39 in FIG. 38. FIG. 40 is an end view of upper portion 3800 taken along line 40-40 in FIG. 38. Upper portion 3800 may be similar to upper portion 1721 in FIG. 17, and upper potion 2321 in FIG. 23. Upper portion 3800 comprises four female receptacles 3802, with a receptacle 3802 in each corner of upper portion 3800. Each receptacle 3802 is configured to provide receive a post 3102 of lower portion 3100. More specifically, each receptacle 3802 is configured to mate with a corresponding post 3102 of a corresponding lower portion. Each receptacle 3802 comprises a surface 3806 that is configured to mate with a lip 3106 of a corresponding post 3102 of a corresponding lower portion 3100.

Figure 41:
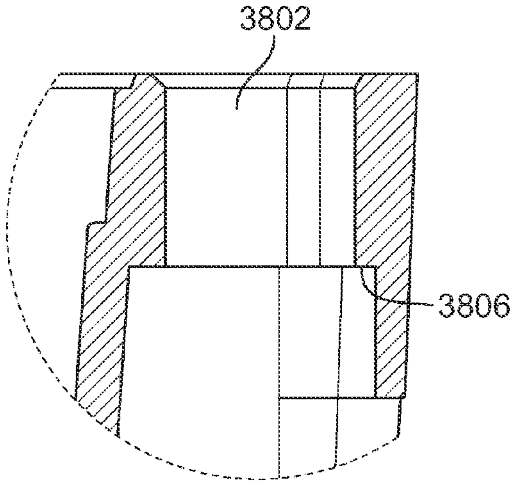
FIG. 41 is an enlarged view of the section of FIG. 39 identified as circle "41" in accordance with aspects of the disclosure.
Figure 42:
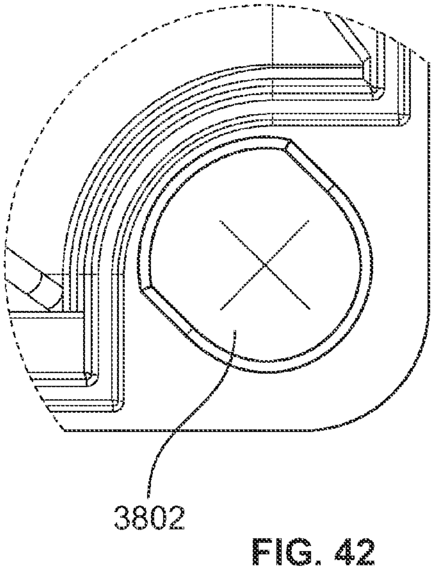
FIG. 42 is a top view of a receptacle shown in FIG. 41 in accordance with aspects of the disclosure.
Figure 43:
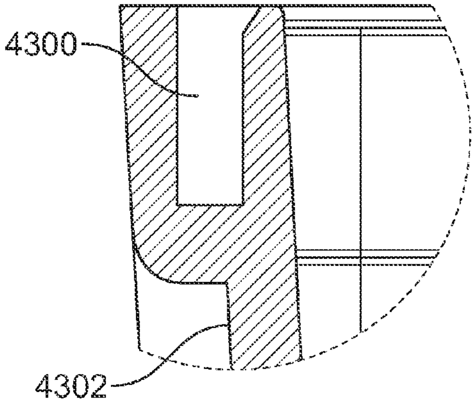
FIG. 43 is an enlarged view of the section of FIG. 40 identified as circle "43" in accordance with aspects of the disclosure.
Figure 44:
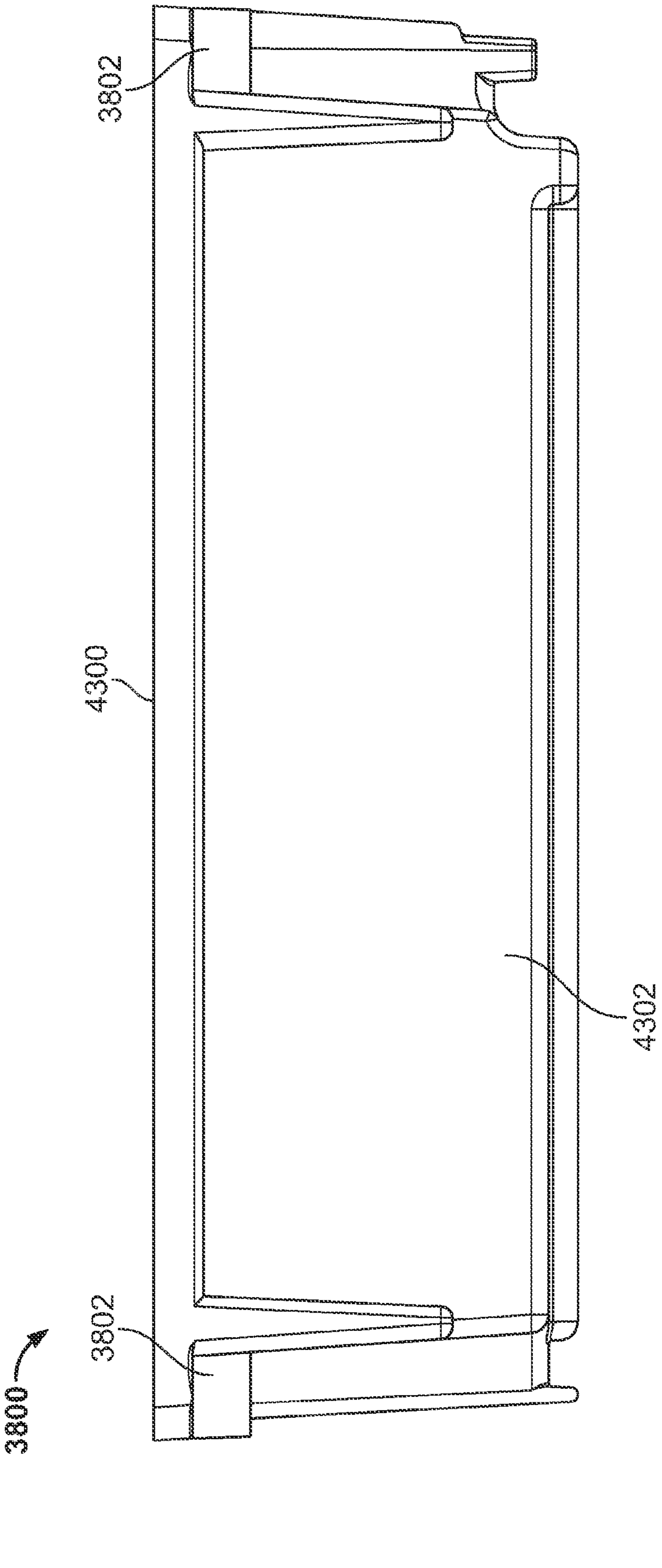
FIG. 44 is a side view of the portion of a cartridge shown in FIG. 38 in accordance with aspects of the disclosure.

FIG. 41 is an enlarged view of the section of FIG. 39 identified as circle "41." FIG. 42 is a top view of receptacle 3802 shown in FIG. 41. FIG. 43 is an enlarged view of the section of FIG. 40 identified as circle "43." FIG. 44 is a side view of the portion of a cartridge shown in FIG. 38. As shown in FIG. 43 and FIG. 44, a groove 4300 is provided along a side 4302 of upper portion 3800 of a cartridge. A similar groove 4300 (not shown in FIG. 36 or FIG. 37) is provided along the side of upper portion 3800 that is opposite side 4302. Groove 4300 is configured to mate with arc 3604 of ridge 3600 of a corresponding lower portion.

Each post aids in mechanical assembly of the cartridge. A tapered alignment ridge is configured to fit into an alignment pocket or groove corresponding in the corresponding upper portion. Those skilled in the art will recognize that various combinations of posts, receptacles, ridges, and/or grooves, etc. may be present in the lower portion and upper portion of a cartridge, and may facilitate proper alignment and mechanical assembly of the cartridge.

Those of skill in the art will recognize that in accordance with the disclosure any of the features and/or options in one embodiment or example can be combined with any of the features and/or options of another embodiment or example.

The disclosure herein has been described and illustrated with reference to the embodiments of the figures, but it should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only and the disclosure is not limited except by the following claims and their equivalents.

The invention claimed is:

1. A method comprising:

determining, by a computing device, a condition of a container holding a beverage component, wherein the container is configured to be used in a beverage dispensing system; and causing information corresponding to the condition to be stored in an RFID tag affixed to the container, wherein the container is placed in fluid communication with a beverage dispensing nozzle of the beverage dispensing system based on the information stored in the RFID tag.

2. The method of claim 1, wherein the condition of the container comprises a temperature in proximity to a surface of the container, the method further comprising:

determining that the temperature is outside of an acceptable range; and causing an indication corresponding to the temperature to be stored in the RFID tag.

3. The method of claim 2, wherein the indication, when read by the beverage dispensing system, limits use of the container with the beverage dispensing system.

4. The method of claim 1, wherein the condition of the container comprises a temperature of the beverage component maintained within the container, the method further comprising:

determining that the temperature is outside of an acceptable range; and causing an indication corresponding to the temperature to be stored in the RFID tag.

5. The method of claim 1, wherein the condition of the container comprises an exposure temperature associated within the container, the method further comprising:

determining that the exposure temperature is outside of an acceptable range; and causing an indication corresponding to the exposure temperature to be stored in the RFID tag.

6. The method of claim 1, wherein the condition of the container comprises a date of last use of the beverage component maintained within the container, the method further comprising:

determining that the date of last use is outside of an acceptable range; and causing an indication corresponding to the date of last use to be stored in the RFID tag.

7. The method of claim 1, wherein the container comprises a cartridge.

8. The method of claim 1, wherein the condition of the container comprises a level of the beverage component maintained within the container.

9. A method comprising:

reading, by a computing device, information from an RFID tag associated with a container holding a beverage component in proximity to a first position in a beverage dispensing system, wherein the first position allows the container to be in fluid communication with a beverage dispensing nozzle of the beverage dispensing system;

comparing the information to an expected value; and providing an indication corresponding to a result of the comparing.

10. The method of claim 9, wherein the container comprises a cartridge.

11. The method of claim 9, further comprising:

unlocking a mechanism configured to allow installation of the container in the first position.

12. The method of claim 9, wherein the indication comprises an indication of a correct location for installing the container in the beverage dispensing system.

13. The method of claim 9, further comprising:

limiting use of the container with the beverage dispensing system, depending on the comparing.

14. The method of claim 9, wherein the information comprises an indicator of a type of the beverage component of the container, an amount of the beverage component in the container, a date, a length of time the container has been installed in the beverage dispensing system, a lock code, or a serialized identifier.

15. A method comprising:

detecting, by a computing device, presence of a cleaning cartridge containing a cleaning fluid in a beverage dispensing system, wherein the presence of the cleaning cartridge is detected by reading an RFID tag associated with the cleaning cartridge; and causing at least a portion of the beverage dispensing system to be placed into a cleaning mode.

16. The method of claim 15, further comprising:

causing transfer of a fluid from the cleaning cartridge through at least one portion of the beverage dispensing system.

17. A method comprising:

detecting, by a computing device, presence of an RFID tag in proximity to a beverage dispensing system;

determining that the RFID tag is indicative of a mode command; and causing at least a portion of the beverage dispensing system to be placed into a mode corresponding to the mode command.

18. The method of claim 17, wherein the mode comprises a cleaning mode, a maintenance mode or a diagnostic mode.

19. The method of claim 17, wherein the RFID tag is affixed to a cleaning cartridge, the detecting the presence of the RFID tag in proximity to the beverage dispensing system further comprising detecting the presence of the cleaning cartridge in proximity to the beverage dispensing system and wherein the mode comprises a cleaning mode.

20. The method of claim 17, wherein the RFID tag is affixed to a cup, the detecting the presence of the RFID tag in proximity to the beverage dispensing system further comprising:

detecting the presence of the cup in proximity to a beverage dispensing nozzle of the beverage dispensing system.

21. The method of claim 17, wherein the RFID tag is affixed to a wand, the detecting the presence of the RFID tag in proximity to the beverage dispensing system further comprising:

detecting the presence of the wand in proximity to a display screen of the beverage dispensing system.

* * * * *